US006937712B2

(12) United States Patent
Lemchen et al.

(10) Patent No.: US 6,937,712 B2
(45) Date of Patent: Aug. 30, 2005

(54) NETWORK-BASED INTERCOM SYSTEM AND METHOD FOR SIMULATING A HARDWARE BASED DEDICATED INTERCOM SYSTEM

(76) Inventors: Marc S. Lemchen, 553 Park Ave., New York, NY (US) 10021; Rovi Cohen, 820 Ocean Pkwy., Apt. 702, Brooklyn, NY (US) 11230

( * ) Notice: Subject to any disclaimer, the term of this patent is extended or adjusted under 35 U.S.C. 154(b) by 0 days.

(21) Appl. No.: 10/406,174

(22) Filed: Apr. 3, 2003

(65) Prior Publication Data

US 2003/0190026 A1 Oct. 9, 2003

Related U.S. Application Data

(63) Continuation-in-part of application No. 10/121,144, filed on Apr. 10, 2002, now Pat. No. 6,792,091.
(60) Provisional application No. 60/358,845, filed on Feb. 22, 2002.

(51) Int. Cl.[7] ............................................... H04M 1/00
(52) U.S. Cl. ............... 379/159; 379/142.1; 379/379.01; 379/379.02
(58) Field of Search ....................... 379/72, 76, 88.11, 379/88.12, 88.13, 88.16, 88.19, 88.23, 156, 159, 160, 164, 167.01, 373.01, 373.02, 373.03, 373.04, 374.02, 142.01; 709/204, 220, 227, 231, 232

(56) References Cited

U.S. PATENT DOCUMENTS

| | | | | | |
|---|---|---|---|---|---|
| 5,014,267 | A | * | 5/1991 | Tompkins et al. | 370/259 |
| 5,978,835 | A | * | 11/1999 | Ludwig et al. | 709/204 |
| 6,212,547 | B1 | * | 4/2001 | Ludwig et al. | 709/204 |
| 6,237,025 | B1 | * | 5/2001 | Ludwig et al. | 709/204 |
| 6,343,314 | B1 | * | 1/2002 | Ludwig et al. | 709/204 |
| 6,426,769 | B1 | * | 7/2002 | Ludwig et al. | 348/14.08 |
| 6,437,818 | B1 | * | 8/2002 | Ludwig et al. | 348/14.09 |
| 6,518,983 | B1 | * | 2/2003 | Grohmann et al. | 345/781 |
| 6,583,806 | B2 | * | 6/2003 | Ludwig et al. | 348/14.08 |
| 6,594,688 | B2 | * | 7/2003 | Ludwig et al. | 709/204 |
| 6,691,111 | B2 | * | 2/2004 | Lazaridis et al. | 707/6 |
| 2003/0161455 | A1 | * | 8/2003 | Lemchen et al. | 379/159 |
| 2003/0190026 | A1 | * | 10/2003 | Lemchen et al. | 379/159 |

OTHER PUBLICATIONS

"Nettopia Timbuktu Pro" Software, www.netopia.com, Tech Nology Buyer's Guide Supplement, p196, p. 01 Summer 1998.*

Kokubu Naomi, Memo Mail Pop–Up Control System, Sep. 17, 1997, JP 97270599, Abstract.*

Benyamin et al., "Silent Alert System", WO 200031952 A1 (WO 0031952).*

* cited by examiner

*Primary Examiner*—Binh Tieu
(74) *Attorney, Agent, or Firm*—Daniel L. Dawes; Myers, Dawes Andras & Sherman LLP

(57) ABSTRACT

A network-based intercom system and method comprises software and the necessary portions of a computer network on which it is implemented. The software includes a dispatcher module to be installed on any of the computers of the network, and an intercom module to be installed on each of the participating computers in the system. The system has the advantage that it can be installed on non-dedicated computers, thus avoiding costly and inconvenient wiring and hardware installation. The system provides automatic message receipt without unnecessarily interrupting a recipient. This is achieved by signaling that a message has been sent by an assigned audible tone that is unique to the addressee. Thus, the recipient becomes aware that he or she has automatically received a message. The message is displayed in a banner on the addressee's computer monitor for selective viewing based on an order of priority. A recipient can respond directly to a message by interfacing with a visual display associated with the message.

64 Claims, 18 Drawing Sheets

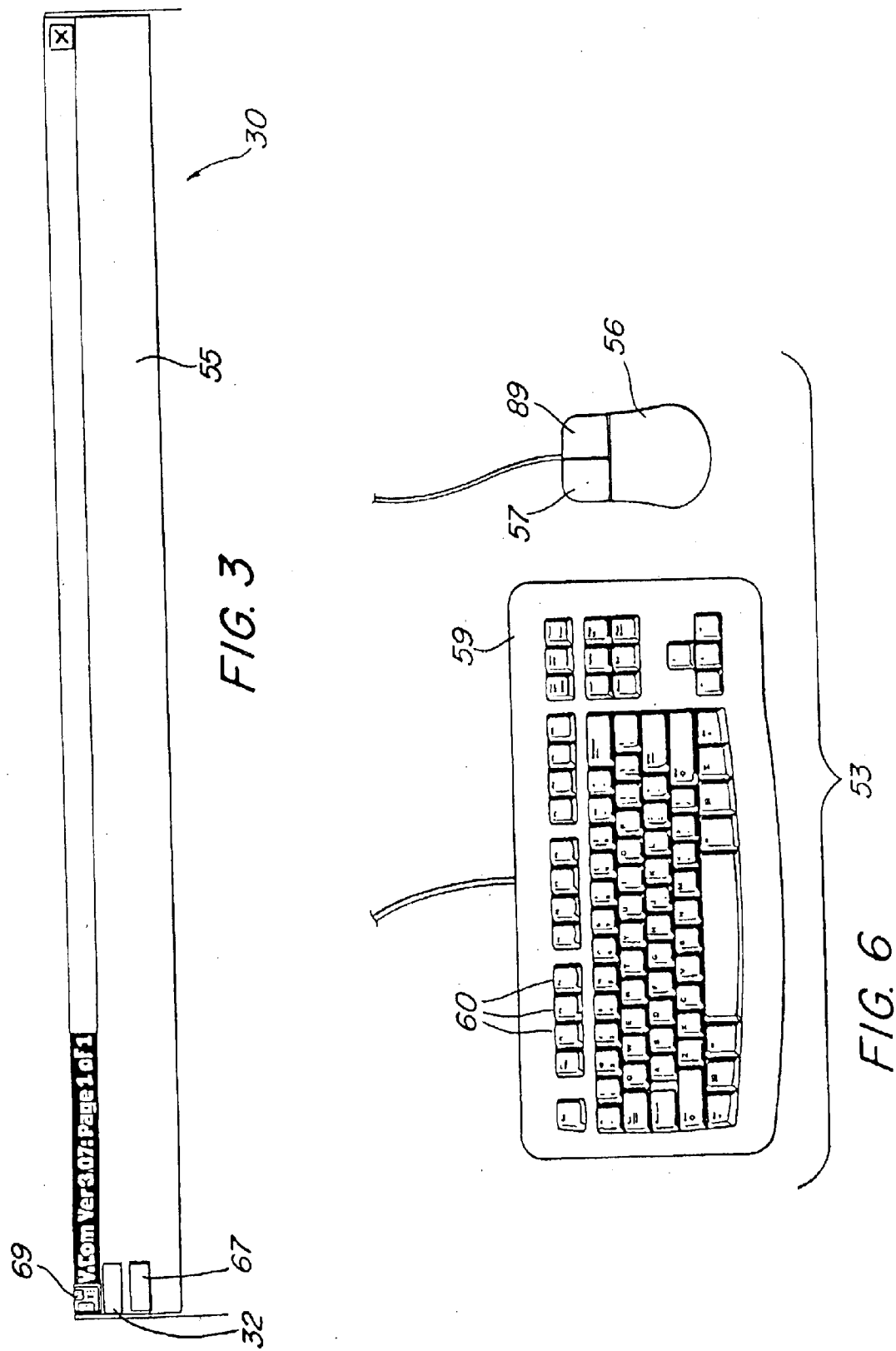

*** Staff 6-Phone Call-Line 5    Doctor 1-Phone Call-Line 5 [Take a message]

LATEX ALLERGY

Lina
Palmer
Dr. Packman

TREATMENT MENU

| | | | |
|---|---|---|---|
| 01 | ENTER TREATMENT DATA | 05 | MAINTENANCE MENU |
| 02 | VIEW TREATMENT DATA | 06 | PRINT MENU |
| 03 | EDIT TODAY'S ENTRIES | 07 | DISPLAY WINDOW |
| 04 | ENTER VIEW TREATMENT PLAN | 08 | OTHER ORTHOTRAC FUNCTIONS |
| PF | MESSAGE        IV 247 | | LAST PROGRESS REV: 6/06/01 |
| CN | COMMON NAME: | CC | CURRENT CARD TYPE: 02 |
| MA | MEDICAL ALERT: LATEX ALLERGY | | |
| CM | COMMENT: | | |

```
010184  LINA      PALMER    SEX:F  TYPE:       STAT:V              :10303
BIRTH: 4/29/71           NOSHOW:0           REFERS:2
WALKIN:44                                   PREV.VIST: 3/04/02  TYPE:
PREV APPT: 2/02/02                          DR.20
NEXT APPT: <<NONE>>  0:00              DENT : 734 PACKMAN
NEXT PRCD:II                                BANDT: 00/00
                                            CONDT: 00/00
COM-1:
COM-2:
```

ENTER FUNCTION ##, 99, or XX:

USE WP TO EXIT IF WRONG PAT

NETWORK-BASED INTERCOM SYSTEM AND METHOD FOR SIMULATING A HARDWARE BASED DEDICATED INTERCOM SYSTEM

This application is a Continuation-in-Part of U.S. patent application Ser. No. 10/121,144 filed Apr. 10, 2002 now U.S. Pat. No. 6,792,091, which is a continuation of provisional application Ser. No. 60/358,845, filed Feb. 22, 2002.

BACKGROUND OF THE INVENTION

1. Field of the Invention

The present invention pertains to the art of software based business methods in general. However, the system of the present invention is for interpersonal communications between a plurality of people in separate locations between which their voices will not conveniently carry. Hence, an aid to transmitting messages is needed and has been filled, in one form, by conventional intercoms. Thus, the invention more particularly pertains to the art of intercoms. In fact, the invention is a software based intercom having many of the advantages of a conventional intercom and further including additional, substantial advantages.

2. Description of the Prior Art

The prior art is devoid of network-based intercoms. The conventional intercoms that are based on hardware and wiring and are often installed in a building. Such conventional intercoms are inadequate in many ways and are expensive. The prior art also includes wireless intercoms that are also inadequate in many of the same ways as the hardware and wire type. In particular, prior art voice intercoms do not permit the recipient of the message to simply choose not to respond to a message without inconveniencing a sender.

There are intercoms or messaging devices that illuminate a certain combination of lights as a code for a specific message. These light combination intercoms are inconvenient because they require the recipient to know the meaning of the combination of lights. Furthermore, the recipient may not know that a message is being sent unless he or she is looking at the lights. Additional drawbacks to the lighted system of an intercom is that the number of users and the number of messages are limited by the number of lights and the maximum number of combinations of lights in the system. Adding users is difficult because of hardware requirements. In order to expand an existing lighted or hard wired intercom system to include a new message or additional users via additional lights, or to include additional locations can be difficult and expensive if not impossible.

The lighted version described above meets the need of keeping a communication confidential from a patient or other person who does not know the codes. Furthermore, it does not necessarily distract the recipient from something requiring his or her attention such as a procedure on a patient. However, under circumstances in which the recipient moves from one location to another location in the office at which the lights cannot be seen, the voice intercom system is required.

The voice intercom system has the drawback of broadcasting messages that preferably should be kept confidential. Alternatives for conveying information to the recipient include sending a third party to locate the recipient or paging them over a speaker system, neither of which is considered to be better than using the prior art intercoms.

As described above, visual and voice communication systems have been provided to display information and messages without any intervention by the recipient. This capability is important, for example, when the recipient is involved in other procedures and is not able to use his or her hands or voice to take the message. Alternatively, the recipient may simply wish to not be distracted at that moment.

Conventional intercom systems operate over telephone networks or dedicated hard-wired or wireless intercom systems. While these systems allow communication, they are not easily continuously modifiable to adjust to changes in the staff, the facility, or the messaging requirements. The conventional systems usually allow communication by a system of colored lights as referred to above. These colored lights are not suitable for colorblind users. These conventional systems may also have the capability of communicating digitally by a series of number codes or by text messages. These messages may be displayed in some prioritized order, but there is no choice of method of display such as static, scrolling, or flashing text or of the number of messages which can be displayed per line of the banner.

The conventional intercoms add to the clutter in an office since they require a desk or wall mounted panel. The mounted panel may be selected from a variety of sizes and appearances available, but there is no assurance that they will fit of match the desk or wall to which they are mounted. Furthermore, mounting of the panels may require running power to the mounting location to supply power to the panel. Even most of the wireless types of intercoms require electrical wiring either for data transmission or for a power source. Hence the need for adding hardware or running wire is not easily overcome with prior art devices.

Outside the realm of intercoms, is a method for communicating called instant messaging that has some similarities to the present invention. However, instant messaging was designed for so called chatting on line. As such, there are specific differences from the present invention. For example, instant messaging requires the recipient to do something in order to retrieve a message sent by another user, and is intended for immediate responses back and forth. There is a need in the art for a software based intercom system utilizing a plurality of computers networked over a local area network or being selectively connected to the World Wide Web (Internet).

There is a need for the software based intercom system to include a software driven dispatcher which resides in any one of the computers with a set of computer readable instructions for performing various functions. These functions may be adjusted by a user interfacing directly with the dispatcher, or indirectly with the dispatcher via one of the computers by selecting user selectable settings. As such, there is a need for the software of the dispatcher to interface with software of an intercom module software in each of the computers of the system in order to control the many settings for each of the computers.

There is a need for a software driven intercom module residing in each computer on the system with a set of computer readable instructions for sending, receiving and filtering messages as well as for controlling other user selectable functions.

There is a need for the software driven intercom system to avoid interference with existing software that is or may be currently running on the system.

There is a need for at least one symbol or indicator to indicate which message of a list was the first message entered into the system in order to enable a user to differentiate among messages.

There is a need for the messages to be accompanied by a tone or voice. In particular, there is a need for the tone to be unique for each recipient in order to distinguish one from another. In this way, the users can be assigned different respective tone sounds to signal that a message has been sent to a particular addressee, which initiates getting the addressee's attention.

There is a need for a software based intercom system to require no intervention on behalf of the recipient in order to retrieve a message. That is, there is a need for the system to receive messages automatically on respective user computers.

There is a need for the system to employ a voice activated message initiation, voice actuated preset message selection, and voice actuated selection of other user options.

There is a need for the system to be capable of identifying the sender and the location of the sender automatically for each message. This identification feature should be selectively activatable by users.

BRIEF SUMMARY OF THE INVENTION

The present invention meets all of the above stated needs. Primarily, the present invention is a software based intercom system. The system is implemented on a network comprising more than one computer networked together over a local area network (LAN) or over the Internet. A plurality of individual computers connected to one another correspond to a respective plurality of network stations for users.

The software based intercom system of the present invention includes a software driven dispatcher which resides in any one of the computers with a set of computer readable instructions for performing various functions including: routing messages, assigning individual audible tones to users, assigning message codes, displaying messages in order of priority by time of entry or other criteria, allowing pre authoring of messages, and designating station numbers. The dispatcher also permits several additional functions in accordance with user input from any of the modules on the respective computers of the network. These additional functions are initiated by the respective users. An example of such a function is filtering individual(s) or groups of individuals. However, the actual filtering is performed by the dispatcher software based on the user selected functions from respective stations. In the illustrated embodiment the actual filtering is performed in the intercom module, but it can also be performed in both the intercom and dispatcher software.

The software driven intercom of the present invention has a software module that resides in each member computer of the system with a set of computer readable instructions for sending, receiving and filtering messages. The software modules also facilitate modifying the placement, size, color, display format, and the time duration and priority of a display. The display format may include user selectable options including scrolling or page changing a list of messages on a message banner of a display on respective computers of the system. The software allows the sender to be reminded if there is no response and gives the sender the option to delete the message or resend a message alert tone without losing priority in placement on the message cue. This can also be set to delete a message to which a response has been given on screen after a preset time period.

The network-based intercom system of the present invention has software that controls the displays and the running of the system program. The network-based intercom system software prevents or inhibits interference by the system with existing software which is currently running on the system.

The system of the present invention provides symbols and/or indicators indicating which of the messages in the list of messages was the first message to be entered so that a user can see the beginning, the end, and a sequence of messages between.

Messages are accompanied by a tone or voice that alerts an addressee that a message has been received, generates a selectable display on top of the screen, which moves down any other program or screen information, or displays a message which disappears after a preset time following posting. Preferably, this tone is a unique tone that permits an addressee to distinguish one message from another with the present invention. To this end, users are preferably assigned different tones or sounds to signal the addressee when a message has been sent. This unique tone or voice may be in the form of a special tone, the addressee's own voice, or the addressee's name, any of which can be programmed into the system.

The present invention further advantageously requires no intervention on behalf of the recipient in order to receive a message. The system of the present invention causes the messages to automatically appear in the banner on the recipient's monitor by software control. The messages scroll, flash, or are otherwise displayed. The system can be set to automatically shrink the banner and park it on the toolbar, or otherwise place it in the background, after a predetermined length of time after the message has been received. A user on any one of the member computers may program the length of time that the messages are to be displayed before being hidden or placed in the background.

As can be understood from the disclosure above, the network-based intercom system of the present invention relates to visual communication systems, and more specifically to an internal communication system having the ability to efficiently formulate and display a message in a visual form. One of the specific features of the network-based intercom is that it calls the attention of the recipient without requiring an immediate response. This is of particular interest in order to avoid distracting the recipient from other, higher-priority activities at the moment the message is received. This feature is of particular interest in the medical fields since interruption of procedures may impact negatively on the outcome of the procedure. On the other hand, this feature is also advantageous in other settings and will be especially beneficial to support personnel such as for receptionists, for example. A major advantage of the network-based intercom of the present invention is that it accomplishes these functions and advantages without the need of any dedicated hardware besides an already existing computer network.

As can be appreciated, a response can be generated in the form of a separate message initiated by the addressee of a previous message. In this way the response appears together with all other messages displayed in the message field of the banner. Such a response may be distinguished as the response primarily due to its context, sender, addressee, and where it falls in the sequence of messages. While responses of this form are usually acceptable, they require an unnecessary inclusion of at least one of an addressee and location. This is considered to be unnecessary because the addressee is implied by the sender of the message being answered and his or her location. Hence a preferred system and method includes direct responses to messages in the message banner.

Whenever a message is generated, and is not limited by the settings, it appears in the message field of the banner of all the participating stations. At least a portion of the visual display of the message or an icon that is positionally associated with the message is clickable for direct addressee interface in order to respond to the message. Hence, when an addressee sees his or her own message or hears his or her unique audio alert tone, he or she may respond directly to the message by clicking on the portion of the visual display of the message that initiates a response. Preferably, clicking on an icon associated with the message brings up a dialog box containing preprogrammed messages associated specifically with the message to which a response is being made, or a box into which a custom message may be typed. For example, if the message is the fact that there is an incoming phone call, the preprogrammed response may be "hold", "take a message", "leave a phone number", "I will call back" and the like. When the response is completed, it is appended to the particular message that was answered and is displayed in a positionally associated location relative to the message in the message field of the banner. Alternatively, the message may be responded to directly by right clicking anywhere on the banner. This generates a pull down menu. From the pull down menu, an addressee may select response and the particular message to which he or she wished to respond. This selection brings up the dialog box with preset responses and the custom response box as set forth above.

The preset responses can be programmed into the dispatcher in a response settings portion of the dispatcher module. Response can also be to log the message for later delivery in the print or screen modes.

Banner options include selectively choosing the position of the banner, its size, color, font, display format, speed of flashing or scrolling, and other aspects of the banner display as described below. The banner may be set to always be in front, in which case the predetermined time before hiding the banner may also be selected. The audio alerts may also be selectively turned off in these settings. Preferably, the banner may be set to automatically appear vertically on top of the screen on which it is displayed without overlapping any other window or display, or always in front of other windows and applications. Preferably, the banner settings include selectively providing at least one of an audio and a visual alert signal to the sender and/or to the addressee at a predetermined period of time after a message has not been answered. Upon receiving the alert signal, the sender can choose to delete or resend the message, or send a new message. The banner settings also preferably include selectively providing automatic deletion of a message when no response has been received for a predetermined time period. Additionally, or alternatively, it is contemplated that the banner settings may include automatically deleting messages after a predetermined period of time after they have been answered.

Embodiments of the present invention comprises a software control based system, a method of providing such an intercom system, a method of using, and an actual user interface that includes the visual displays, the clickable icons or labels, and the audio signals. The messages and responses can be initiated and completed in a variety of ways that are recognized by the system under software control.

While in the preferred embodiment, the system generally relies upon text input or other manual actuation for formulating and sending messages, the system may alternatively or additionally include one or more of voice activated message initiation, voice actuated message formulation, and possibly even voice activated user selection of options. Voice or command recognition technology including voice or speech recognition software may be integrated in the system to achieve a partially or fully voice actuated network-based intercom system.

The voice actuated system could be actuated by an assistant at a patient's chair or anywhere in the room, for example. In this way, a message could be created by the assistant requesting that the doctor come to a particular chair or location.

Alternatively, a remote control device could be employed in combination with the system. The remote control device of the instant invention can either be carried by the user or installed at a site. For example, a remote control device may be included with or integrated into a chair structure or on a cabinet. The present invention also includes the ability to selectively, automatically identify the sender and the source location of a message. Like many other features of the system, this can be set by user selection of this option.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the Judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 3 is a screen view of the display banner of the present invention;

FIG. 5A is a screen view of a typical monitor screen having the display banner thereon;

FIG. 6 is a top plan view of computer input devices;

FIG. 13 is a view of the message setup screen in a fifth configuration;

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1A:
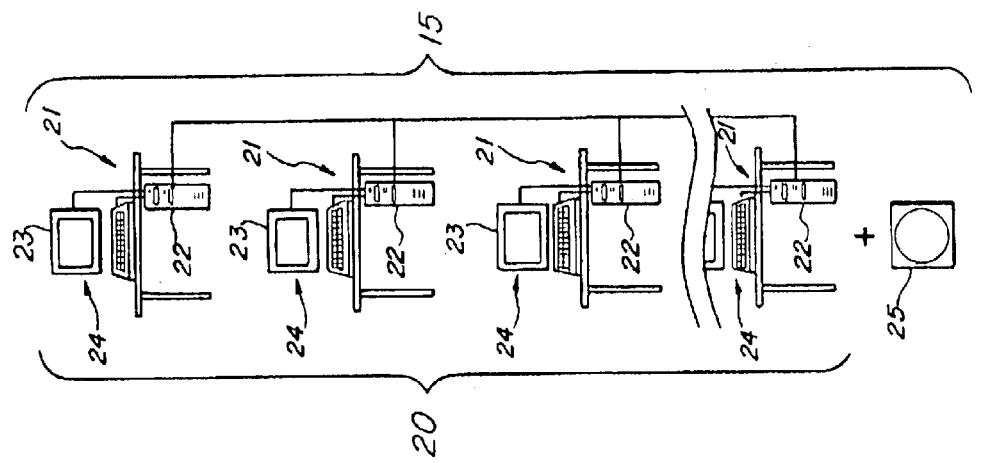
FIG. 1A is a schematic diagram of the system of the present invention.

FIG. 1A is a schematic depiction of the network-based intercom system 15 of the present invention. As shown in FIG. 1A, the system 15 is employed in and includes the necessary elements of a network 20. The Network 20 may be a local area network (LAN). The network 20, of course, has computers 21 connected together. Each computer includes a processor 22 and a monitor 23. Each computer provides a respective station 24. The network-based intercom system 15 also includes the network-based intercom system software 25.

Figure 1B:
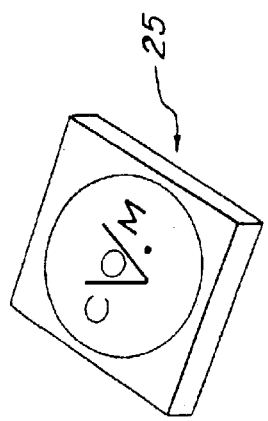
FIG. 1B is a perspective view of the software package of the present invention.
Figure 2A:
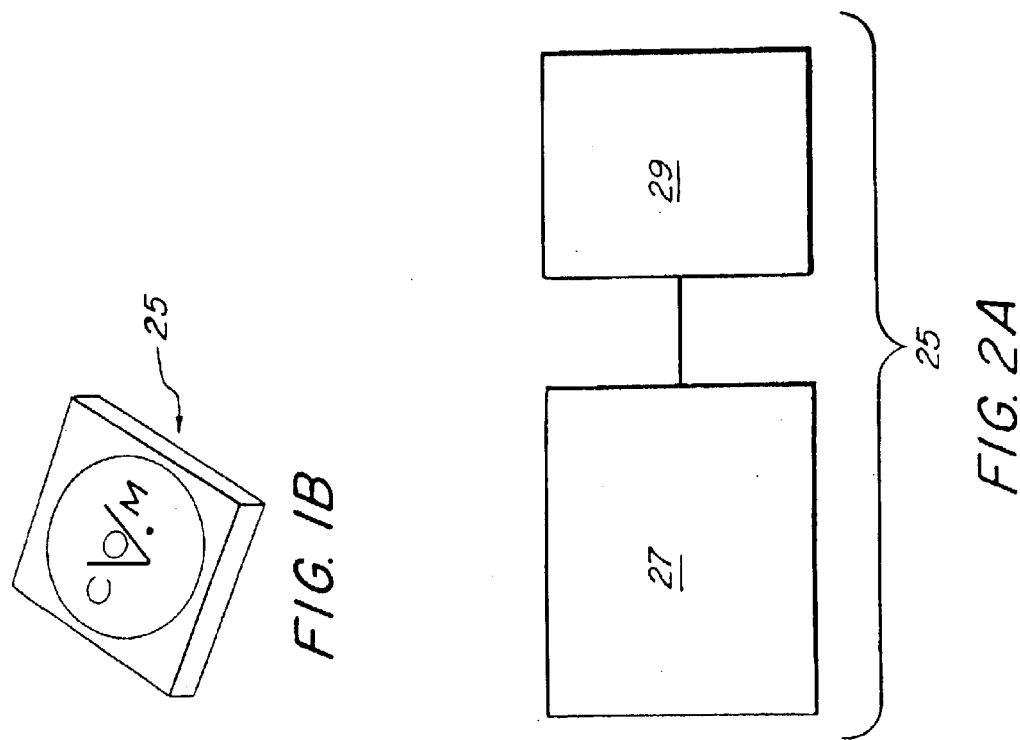
FIG. 2A is a schematic view of the two components of the software.

As shown in FIG. 1B, the network-based intercom system software 25 may be packaged in a conventional CD and carried in a case for protection and marketing. The network-based intercom system software 25 has two components that interact with each other, most commonly via the network. The two components are shown in FIG. 2A. The first component is a dispatcher 27 which includes dispatcher software or control software. The dispatcher may be installed on any of the computers 21 of the network. The second component of the network-based intercom system software 25 is the intercom module 29. The intercom module 29 has user interface means under software control. The intercom module 29 is to be installed on each of the computers of the network that is intended to participate in communication by way of the network-based intercom system 15.

Figure 2B:
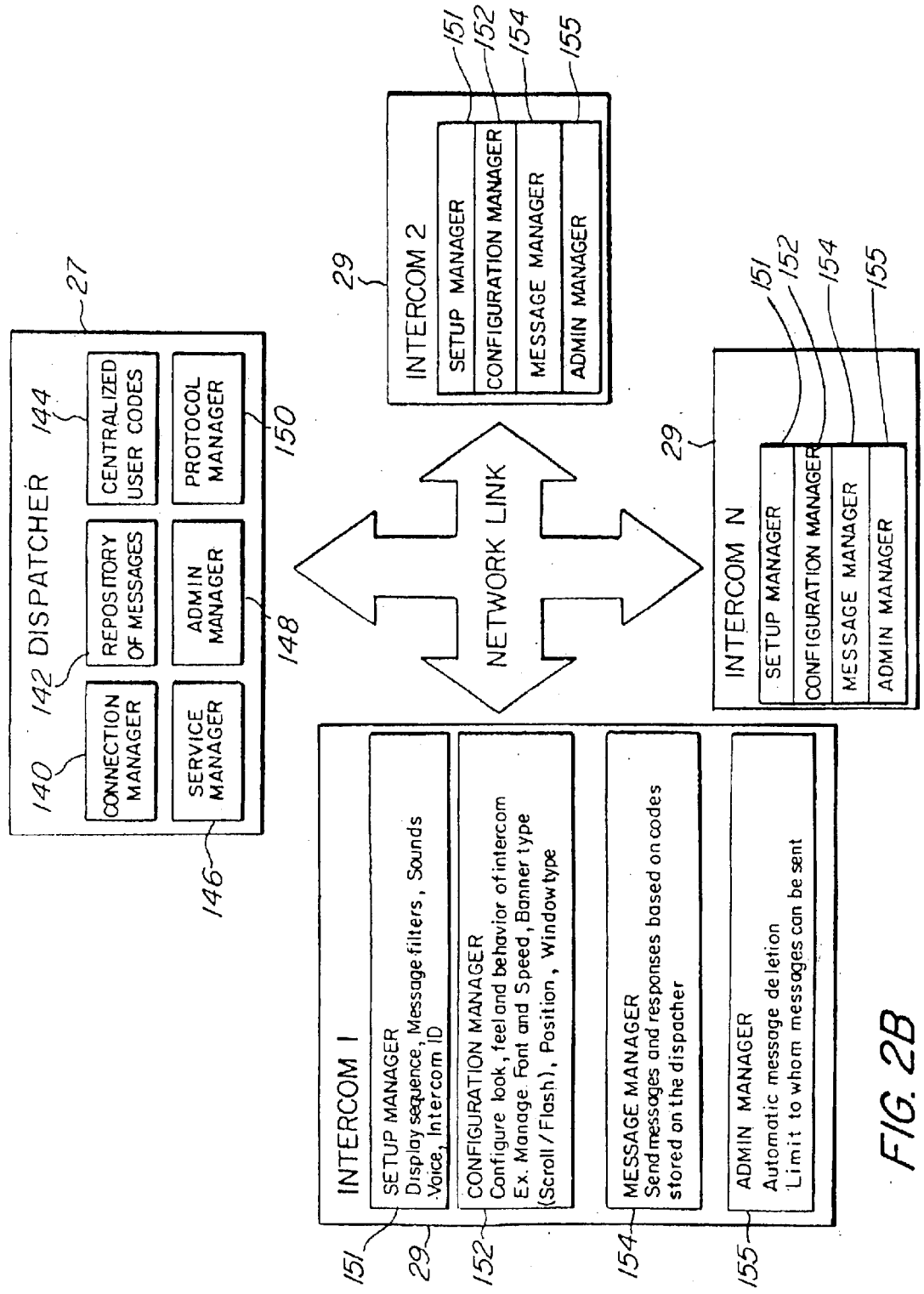
FIG. 2B is a block diagram of the components of FIG. 2A showing greater detail as to their subdivisions and functions.

The function and interaction of the different modules is shown in greater detail in FIG. 2B. As shown, the dispatcher 27 includes several parts performing several respective functions. The Connection Manager 140 provides a viewable console to monitor all connections in the system 15. The Repository of Messages 142 is a centralized storage of communication and messages. The Centralized User Codes 144 is a centralized storage of user defined message codes that are synchronized with all intercoms on the system. The Service Manager 146 keeps a message alive to verify an associated connection. The Administration Manager 148 handles registration messages, verification of licenses, and synchronization of data between the dispatcher 27 and the intercom 29. The codes, (which include messages, groups, and hot keys), are continually synchronized between the dispatcher 27 and the intercom 29 by the Administration Manager 148. The System Protocol Manager 150 handles adding and deleting of messages, deleting groups of messages, and changes in settings as they are applied to the banners.

Each intercom module 29 includes a Setup Manager 151, a Configuration Manager 152, a Message Manager 154, and an Administration Manager 155 as shown in FIG. 2B. The particular functions of the various parts and modules of the software are determined by the program code. The language used for the program code can be any of a variety available. However, at the time of the invention, the program was written in Visual Basic. The actual code is included in the file wrapper as Appendix A, but is deleted from the application prior to any publication thereof.

FIG. 3 shows a banner 30 supported by the Message Manager 154 of the software 25. In the preferred embodiment, the banner 30 automatically appears on a monitor 23 when the dispatcher 27 and the intercom module 29 have both been installed. The banner 30 will also automatically appear thereafter each time the dispatcher 27 and the intercom module 29 are run. The banner automatically comes up on the top to the screen when the intercom module 29 is run. The intercom module 29 preferably, automatically resizes the window previously in use to allow the banner 30 to sit on top, and not obstruct any part of the window that was previously in use. The intercom module can also be set to automatically resize subsequent windows that are brought up so that they do not cover the banner 30. Alternatively or additionally, the banner can be resized manually as further described below. To use the intercom system 15, a user clicks on soft button 32 at the upper left end of banner 30. Doing so brings up a simulated intercom panel 35.

Figure 4A:
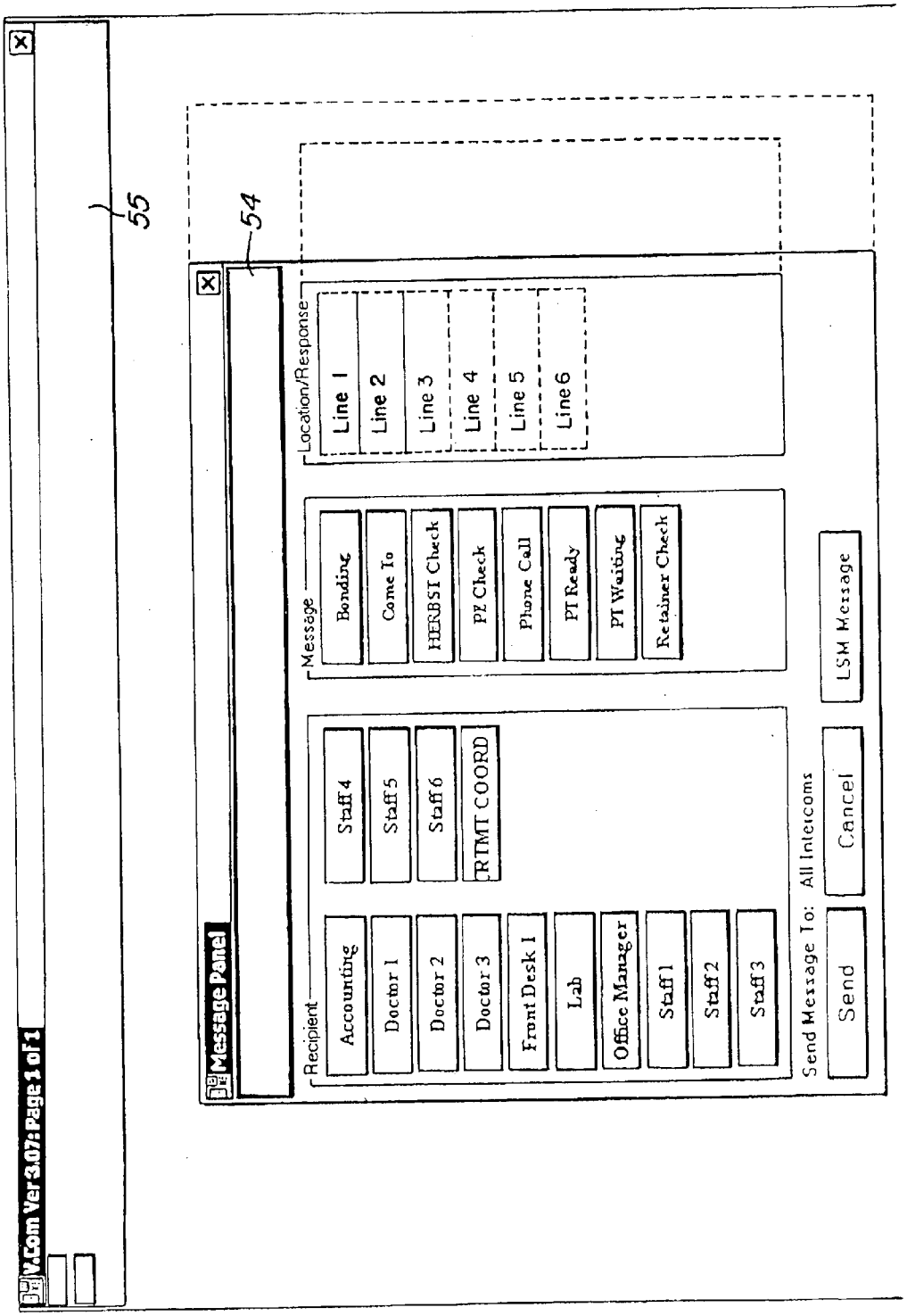
FIG. 4A is a screen view of the simulated intercom panel of the present invention.

FIG. 4A is a plane view of the simulated intercom panel 35. The simulated panel 35 functionally simulates a conventional intercom and is supported by the Message Manager 154 portion of the software 25. The simulated panel 35 is also a message creating panel. A message may be made up of any number of components. However, the number of components per message in the preferred embodiment is three as indicated by the three categories from which a user may select components as shown in FIG. 4A. A first component of the message comprises an addressee or recipient, selected from a list of addressees 40. A second component comprises a preset message selected from a list of preset messages 45. The third component comprises one of several types including a destination location, a phone line, or a previously programmed message response. Thus, the third component is selected from separate lists of locations, phone lines, and responses 50. A third component type will vary depending on the selection of the second component. For example, upon selection of a second component, a specific third component list corresponding to the selected second component will appear for the third component selection. As illustrated in FIG. 5A, once the three components are selected, the message is displayed in the banner 30 with the three components separated by dashes.

Figure 4B:
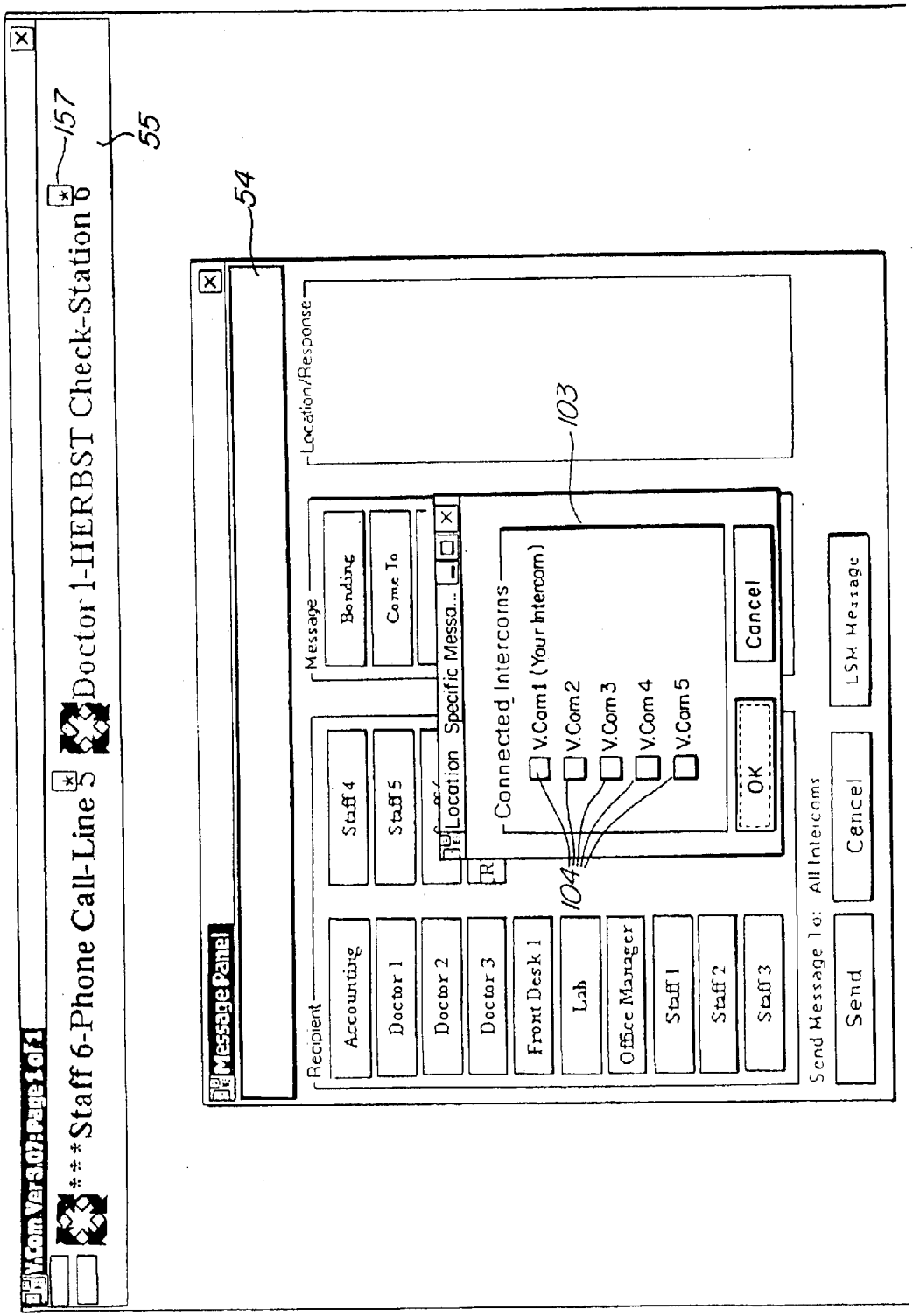
FIG. 4B is a screen view of the simulated intercom panel with an overlying options box.

The simulated intercom panel 35 of FIG. 4A further includes a soft button 97 for limiting the addressees to whom messages can be sent. This feature is called Location Specific Messaging (LSM). Clicking on the LSM button 97 brings up a dialog box 103 in front of the simulated intercom panel 35 as shown in FIG. 4B. This dialog box 103 has a column of locations or stations with a corresponding column of boxes 104 that can be checked or unchecked in a toggle manner. This feature could alternatively be enabled by a function key. When no boxes are checked, the messages sent from the station of a particular simulated intercom panel 35, will be displayed in the banners 30 of all of the active stations. On the other hand, if any of the boxes 104 is checked, messages sent subsequently will only be displayed on those stations corresponding to the box or boxes checked.

This feature is useful in limiting the clutter of messages displayed on the screens of the users or for keeping messages confidential. For example, if it is known that a sender will only be targeting one or two stations out of ten, it would make sense to use LSM to limit the Locations to just those two stations so that users of the other eight stations do not have to sift through messages that do not pertain to them.

This LSM feature is controlled by a combination of the Message Manager portion 154 of the Intercom module 29 and the repository of messages portion 142 of the Dispatcher module 27. A user interface for this feature is preferably achieved by clicking on the soft button 97 illustrated in FIGS. 4A and 4B.

The Message Manager 154 of the Intercom Module 29 of the software 25 provides for messages to be sent based on codes stored in the Dispatcher Module 27 of the software 25. Messages sent and received in the system are displayed on the banner 30. An example of the banner 30 on a user's monitor screen is depicted in FIG. 5A.

A message may be initiated in any of a variety of ways. The input devices 53 of the preferred embodiment are shown in FIG. 6, although any of a variety of additional input devices could be used. When a message is being generated, it will show up in the message field 54 of the sender's intercom panel 35 as shown in FIG. 4A. Typically, a mouse 56 is used to input the components of the message by clicking a mouse button 57 when the curser or arrow is on the list item to be selected. Each time a component is selected, it shows up in the message field 54 of the intercom panel 35 shown in FIG. 4B.

The message may be sent by any of a variety of ways. One way is to simply select all of the components of the message at which time the message is automatically sent. Another way is by using the keyboard 59. A message send may be accomplished by pressing a function key 60. Another option is to click on the soft send button 63 in the lower left corner of the intercom panel 35. When explicitly initiating a send by pressing a function key 60 or clicking on the soft send button 63, all the components of the message need not to have been selected. Another option for sending a message is to place the curser in the message field 54 of the intercom panel 35 and to type a customized text message. It is contemplated that any of the above message creating and sending steps may be used alone or in combination for message creation and sending. Of course, all of this is facilitated by software control of the network-based intercom system software 25.

As shown in exemplary FIG. 5A, typical first and second messages 122, 124 show up in the message field 55 of the banner 30. The messages 122, 124 each have three parts separated by dashes. A symbol 66 is displayed next to either a first or a last element in a list of messages in order to provide a frame of reference of where the list of messages begins and ends.

The configuration of the banner 30 and the behavior of the intercom module 29 are controlled by the Configuration Manager 152 of the software 25. The display format of the messages and other banner options may be selected by clicking on a banner options soft button 67 as will be further described below. Other banner options such as size, position, minimize, and close may be adjusted by clicking on banner icon 69.

The present invention has a feature that allows a recipient to respond directly to the sender via the message that was received. This feature is software controlled by a combination of the Message Manager portion 154 of the Intercom module 29 and the Repository or Messages portion 142 of the Dispatcher module 27. A user interface with this direct response feature is achieved by clicking on a four folded arrow icon 112 shown in FIG. 5A near a first message 122 in the message field 55 of the banner 30. A single left click on the icon 112 brings up a response options box 114 as shown in FIG. 5B.

Preferably, the four folded arrow icon 112 is displayed together with each of the messages. This icon 112 provides a direct link to the response options box 114 shown in FIG. 5B. By clicking on a particular icon 112, an addressee is permitted to respond directly to the corresponding message with which it is positionally associated. The system 15 brings up the response options box 114 with a variety of preprogrammed response options 117.

As can be appreciated, the recipient may then select one of the several preprogrammed options 117, or may type in a custom response in window 118. Clicking on the send button 119 simultaneously appends a response 123 to the message 122 being answered in the message field 55 and sends an audio alert by an audio signal that is preferably unique to the user who sent the original message 122.

Figure 5B:
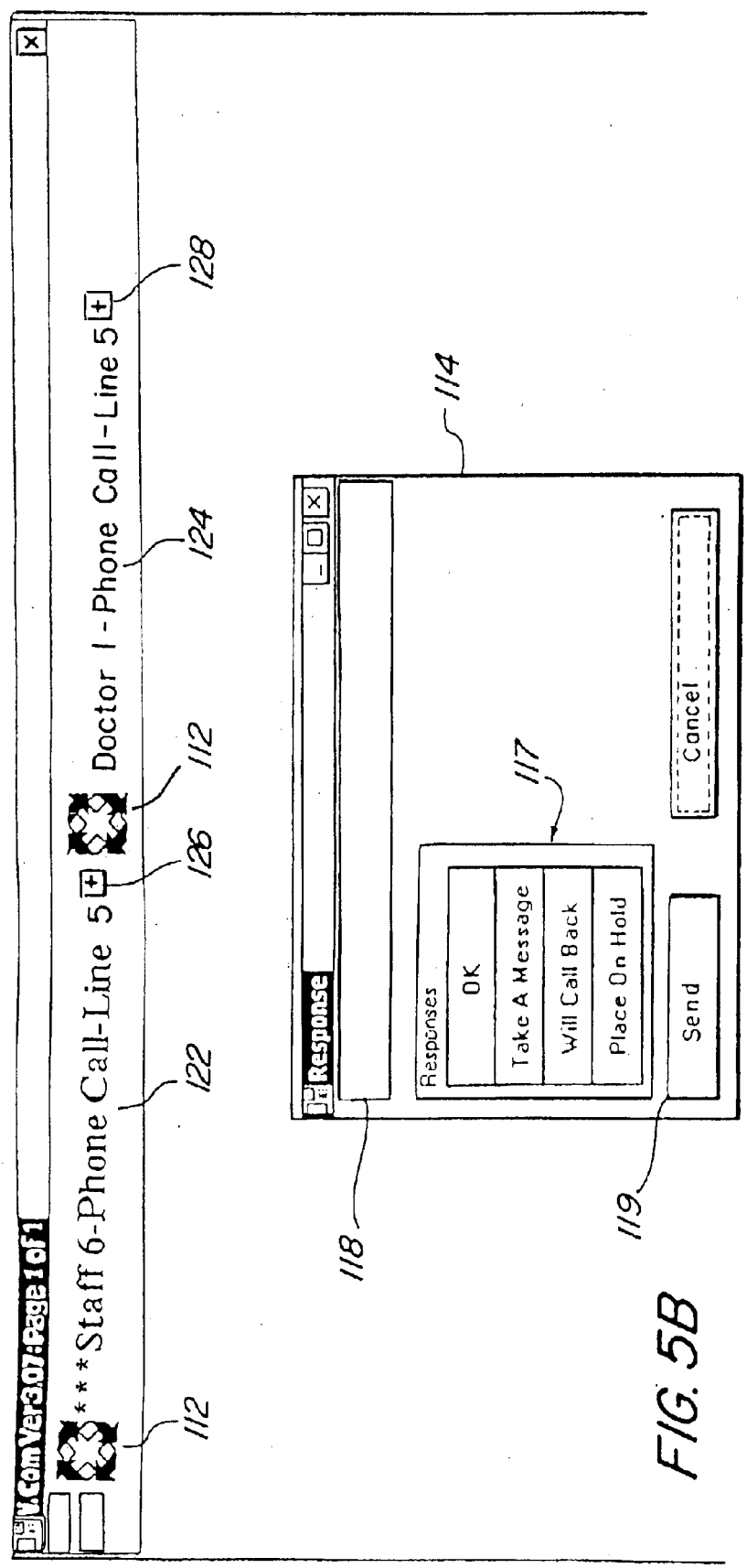
FIG. 5B is a screen view similar to FIG. 5A with an overlying response options box.

As shown in FIG. 5A, the response 123 is appended to the original message 122 along with a small box 125 with a minus sign therein so that the sender can see the response 123 on his or her own screen next to the original message 122. When several messages 122,124 are in the message field 55, appended responses 123 can be hidden by right clicking or double clicking on the box 125. Hiding the responses 123 in this way converts the minus sign to a plus sign as shown in FIG. 5B.

For clarity, as shown in FIG. 5B, the message field 55 has a first original message 122 and a second original message 124. Respective hidden appended responses are indicated by the first and second small squares 126, 128 with plus signs therein and located at the end of the first and second messages 122, 124.

Figure 5C:
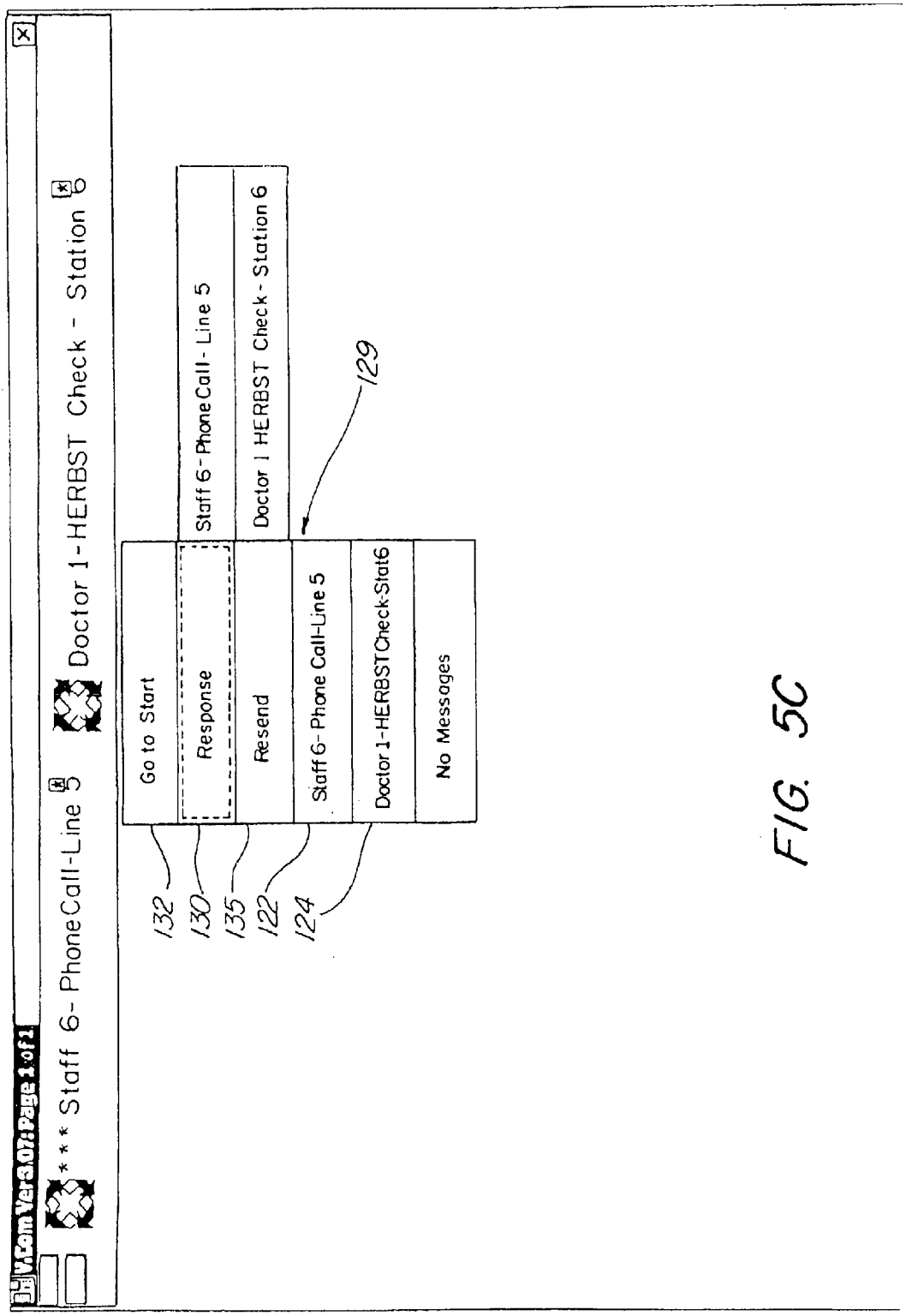
FIG. 5C is a screen view of the banner of FIGS. 3 and 5A with a pull down menu.

The messages 122, 124 can alternatively be responded to by right clicking anywhere in the banner 30. Right clicking on the banner generates a drop down menu 129 as shown in FIG. 5C. Then the user selects the "Response" button 130 and the specific message to which he or she wishes to respond. This series of clicks will bring up the options box 114 shown in FIG. 5B.

Additional features can also be actuated effected via options of the drop down menu 129 of FIG. 5C. For example, clicking on the "Go to Start" button 132 displays the oldest message at the far left of the message field 55. Clicking on the "Resend" button 135 permits the user to select and resend a specific message along with its simultaneous initial audio alert unique to the intended recipient. Clicking on any of the specific messages 122, 124 in the drop down menu 129 deletes the clicked message. When there are no messages in the banner, a "No Messages" label 131 appears in the drop down menu 129.

Figure 7A:
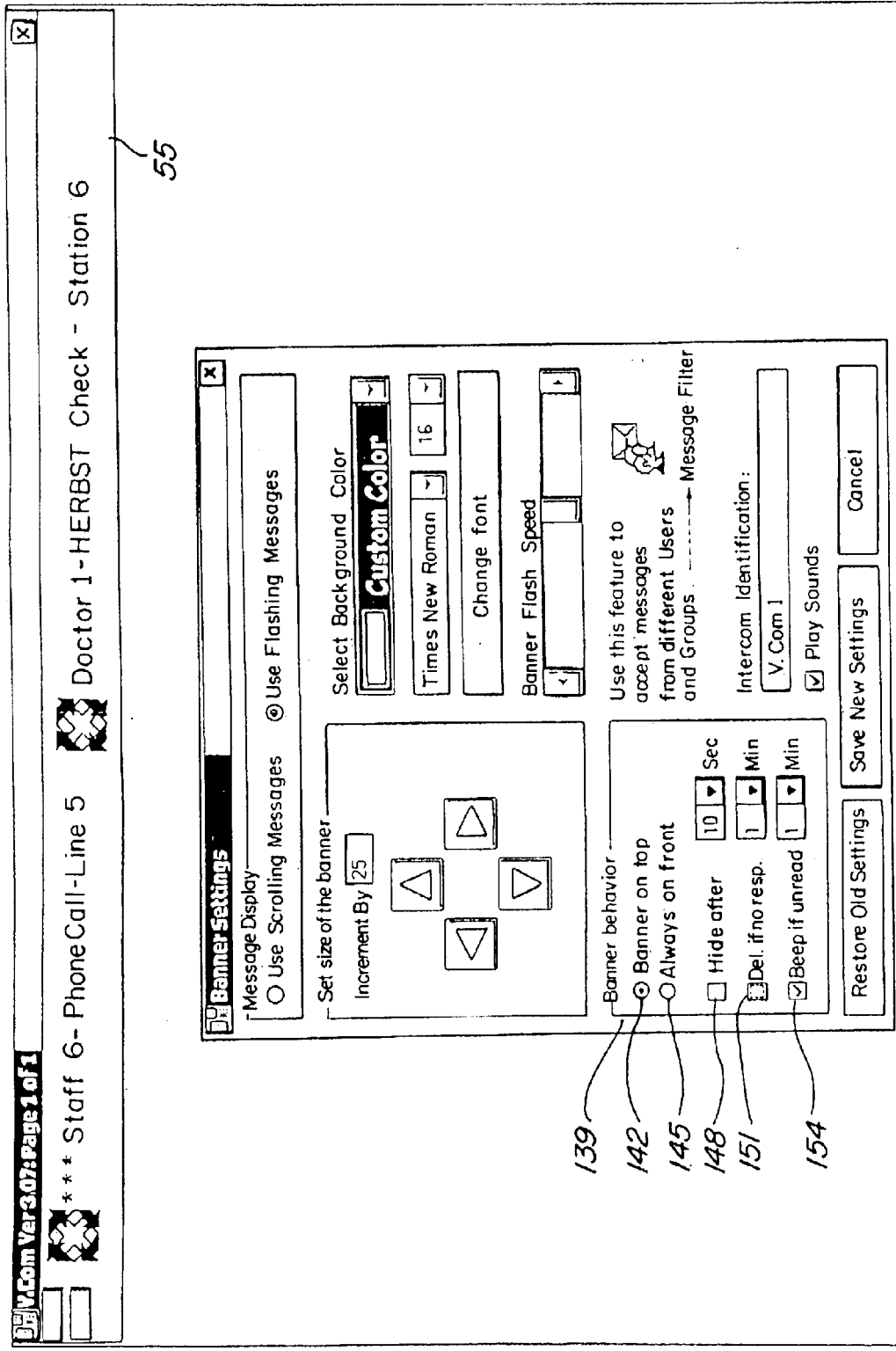
FIG. 7A is a view of the banner settings screen.

Upon clicking soft button 67 of the banner 30, a banner settings screen 78 is brought up as shown in FIG. 7A. The display format of the banner may be adjusted in a variety of ways through selecting settings on the banner settings screen 78. The intercom settings screen 78 has a message display format box 80 permitting a choice of scrolling messages or flashing messages. The speed of scrolling and flashing can also be selected. Banner color select box 83 permits selection of the color of the banner. A continuous "Banner on Top" bubble 142 and an "Always in Front" bubble 145 with timed display box 148 permit user selection of whether and how long the banner will be displayed before being hidden.

Specifically, in the lower left quadrant 139 are several boxes and bubbles for selectively toggling on or off. A bubble 142 is clicked to turn on a "Banner on Top" feature, which places the banner 30 always vertically above the other windows on a user's screen. Thus, the banner of the present invention will not cover the other active windows on the user's screen. When this bubble 142 is clicked again to toggle this feature "off", a second bubble 145 is automatically filled and an "Always in Front" feature is toggled "on". The "Always in Front" feature always places the banner in front of all other windows that were previously activated, are currently active, or that will be activated while this feature is "on".

With the banner in the "Always in Front" mode, the banner can cover part or all of other active windows. Therefore, a "Hide" feature is enabled when this feature is toggled "on". To select this feature, the user may check a box 148 and select a time period, preferably in the range from 10–60 seconds, after which the banner will be hidden. However, greater or lesser periods could be provided without departing from the spirit and scope of the invention.

A box 151 may be checked by clicking in order to turn on a "Delete if no Response" feature. This feature aids in reducing clutter on the banner message field 55. Once again, if the box 151 is checked, then a period may be selected. The period of time after which a message is deleted if no response has been received is preferably in the range from 1 to 5 minutes. However, other periods can be implemented without departing from the spirit and scope of the invention.

Figure 7B:
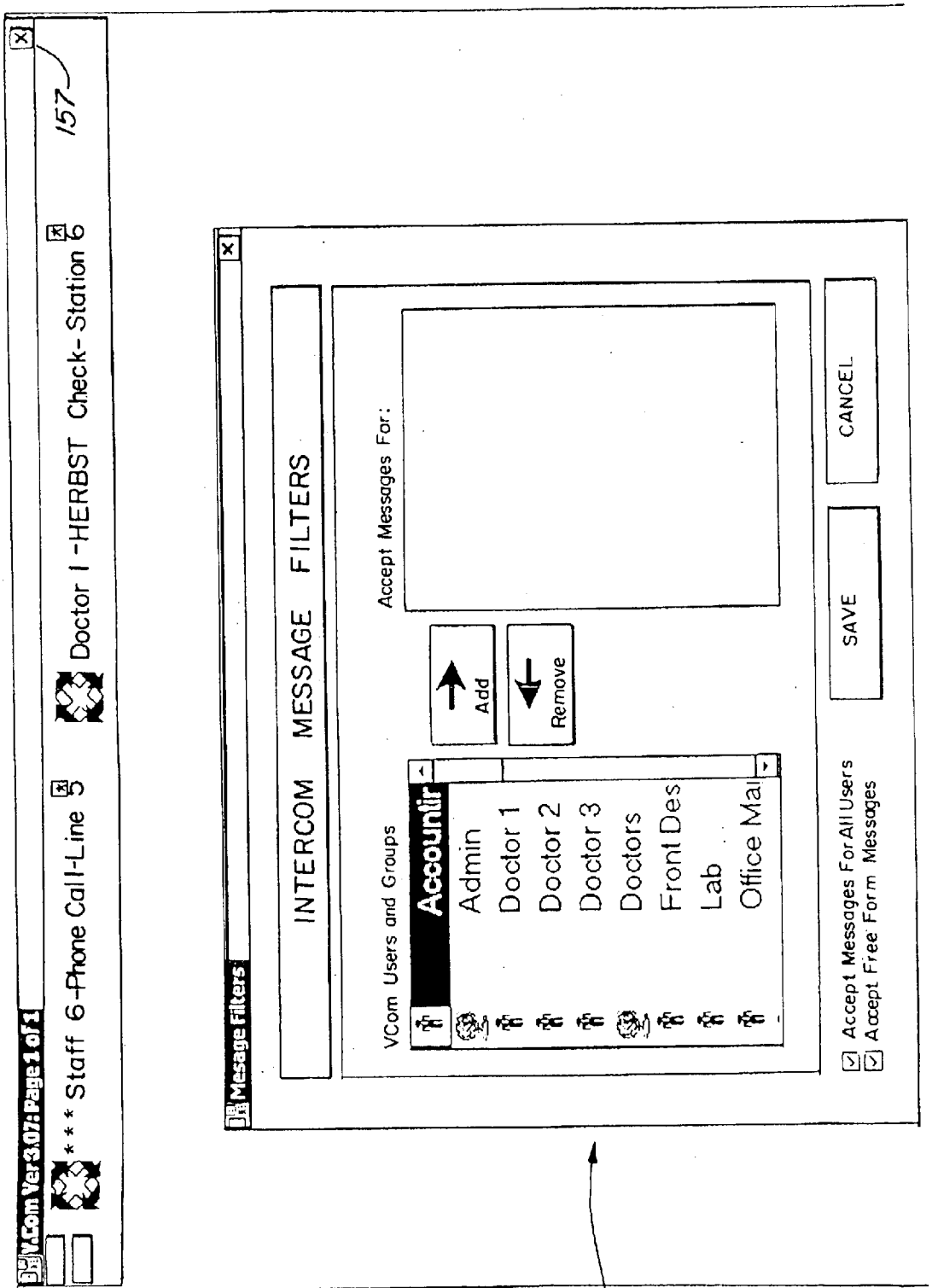
FIG. 7B is a view of the filter setting screen.

A box 154 is further provided to enable user interface to selectively turn on or off an "Audio and Visual alert" feature, which alerts the sender if the message sent has not been responded to within a pre-selected period of time. The audio alert may be a beep or other audible signal. The visual alert may be in the form of an asterisk 157 or other symbol associated with a particular message that has not been answered as shown in FIG. 7B. The audio and visual alert feature is a clean up feature that prompts the sender to either resend or delete a message that was sent a predetermined period of time before. Preferably this period is in the range from 1–20 minutes. Alternative ranges or periods may also be selected without departing from the spirit and scope of the invention. The sender is also given the option to resend or delete if the mouse is left clicked on visual alert (for a message to which no response is given or to a noncanceled message). Resending keeps the message in its correct priority in the cue, but resends a recipient's individual call tone.

Furthermore, it is contemplated that the system could provide an audio warning or reminder to the recipient that he or she has a message to which has not been made. In other words, a message to which a response has been made may be deleted after a preset time, if there is no additional messaging relating to it. If the message has had no response, then it will not be deleted if there is no further message activity related to it.

The banner settings screen 78 also includes a filter selection icon 93 supported by the intercom module 29 of the software 25. The filter selection icon 93 permits selection of individuals, groups, or locations that can be filtered out of the list of potential senders from whom messages can be received. This option can further or alternatively greatly reduce the clutter of unnecessary messages when it is known that no messages from a certain group, individual, or location will be pertinent to the recipient user. Upon clicking on icon 93, a filter selection screen 95 as shown in FIG. 7B is brought up. As can be seen, a user may selectively permit messages to be received from individuals and groups by forming a list. It is contemplated that a filter may be provided that prevents a user from sending messages to selected individuals, groups, or locations as well.

Another convenient feature of the invention is that the user may selectively set the system to include information identifying at least one of a sender and a location from which the message has come. The means for setting this feature may include a function key, a soft button, or an icon that brings up an option selection box. This information may be automatically displayed on the banner or may be selectively activated by placing a mouse pointer over the message to bring up the information in a tool tip fashion. Alternatively, a sender's location may be displayed in response to actuation of a hot key, for example, by pressing the "ctrl" and "F" keys to bring up a preprogrammed message identifying the location of a sender.

When the system 15 is configured to automatically identify one of a sender and a location from which the message has come, it may do so by displaying the location or an intercom ID of the station from which the message was sent. In this way, a time saving feature is provided in which the location is implied by the sender and explicitly generated by software control to be that of the sender. This arrangement reduces the number of hot keys, for example, that would have to be programmed. In particular, a hot key could be programmed for each procedure. Then, a message could be sent by selecting the recipient and pressing the hot key having the desired procedure. In this way, a recipient receives a full message including the location at which the sender is requesting the particular procedure. This feature is termed autoloc™ signifying the automatic location assignment. Hot keys are also set up to indicate recipient and the procedure. Autoloc assigns the location to which the recipient should go.

Another convenient feature for customizing a partially automatic message is by using hot keys to generate specific pre-programmed partial messages. Advantageously, when the last of a combination of keys, for example, are pressed by the sender, a dialog box or window is automatically pulled up by software control to permit completion of the message by the sender. This has the advantage of offering an intermediate level of automation to message preparation and sending. Alternative ways of pulling up the dialog box are considered to be within the scope of the invention. For example, while the last in a series of keys pressed in a hot key command will normally pull up the dialog box, an additional key may be added to any combination and in any sequence to bring up the dialog box. Messages created with this feature are termed hotmessages TM. Utilizing this feature is called hotmessaging TM.

An additional convenient feature is that of dual messaging for a single recipient. This feature is useful when a sender has a non-urgent message that needs to be sent. A list of these non-urgent messages may be printed out or viewed, and reviewed periodically by the recipient. Alternatively, the non-urgent messages may be automatically printed out at particular time of the day. This feature can be activated by the sender and is facilitated by software control. The result is that the message to be sent will be stored as a non-urgent message for later printing or retrieving. This optional feature of storing a message may be in addition to a standard transmission of the message. This secondary message type in addition to the primary type that automatically shows up on a recipient's banner provides a dual messaging feature in which selecting the option of storing provides a permanent record of the sent message that can be retrieved and printed in addition to the sent message displayed on a recipient's banner. The means for selecting this option may include a function key, a soft button, or an icon that brings up an option selection box. These setup features are supported by the Setup Manager 151 portion of the software 25. The Setup Manager 151 also controls the look, feel, and behavior of the intercom 29. Configuring the looks, behavior, window types, and setting intercom IDs is done through the Setup Manager 151 of the software 25 preferably via the intercom settings screen 78.

Figure 8:
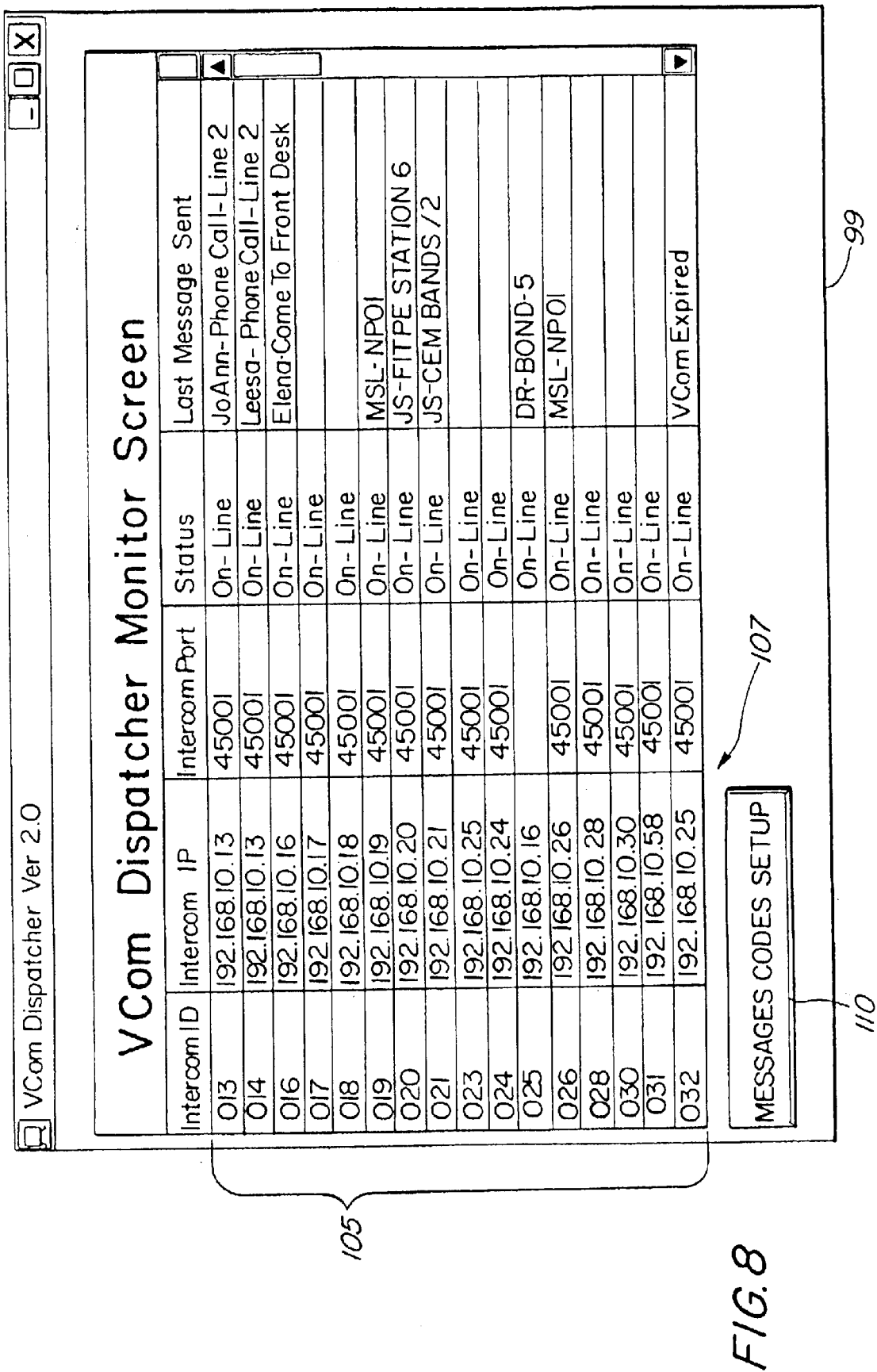
FIG. 8 is a view of the dispatcher screen.

FIG. 8 shows the dispatcher screen 99 that will only be displayed on the monitor 23 of the computer 21 on which the dispatcher has been installed. In the preferred embodiment, the dispatcher is to be installed only on one computer 21 of the network. Otherwise, the intercom system will not function properly. The user of the computer 21 having the dispatcher can view information for all of the stations 24 on the dispatcher screen 99. Among other information, the dispatcher screen 99 has a list of stations 105 represented by respective station identification numbers and a list of corresponding computer IPs 107.

In another embodiment, the dispatcher is installed on each of the member computers 21 of the network. In this embodiment, the software permits the intercom module 29 and banner 30 to function properly even though the dispatcher module 27 is installed on each computer 21. In this embodiment, only one of the dispatcher modules is permitted to be active. This is achieved by software control. For example, the first computer 21 that is turned on may be the computer having the active dispatcher 27. Alternatively, the dispatcher of the most recent computer 21 communicated with the network 20 can be automatically activated and the dispatcher that was previously operating can be automatically shut down by software control. In this way, the dispatcher 27 in this embodiment is a roving dispatcher. It can be appreciated that the software 25 must comprise a means for transferring information to the newly activated dispatcher. Any of a variety of arrangements is acceptable as long as the system software activates one dispatcher 27 when another is turned off. That is, turning off the computer 21 or closing the intercom module itself on a given computer 21 having the currently active dispatcher 27 has the effect of providing for activation of another one of the dispatchers 27 through software control as long as at least one computer is on. In this embodiment the dispatcher 27 and the intercom 29 may be integrated as a single module.

The roving dispatcher 27 embodiment is especially advantageous for networks in which at least one of the computers 21 is configured to automatically shut down after a predetermined time idle. The roving dispatcher embodiment prevents the intercom from being shut down while at least one computer 21 of the network 20 is on. It is contemplated that the roving dispatcher embodiment would be advantageous, for example, in a home network in which a computer may be configured to shut down automatically, or in which younger members of the family might accidentally or purposely shut down one of the computers 21 or the intercom modules 27, 29 on the computer 21. With the roving dispatcher, the rest of the computers 21 and the intercom system 15 are not affected when the active dispatcher is disabled. In either embodiment a user may adjust the settings for the dispatcher by clicking on the setup soft button 110 at the lower left corner of dispatcher screen 99.

Figure 9:
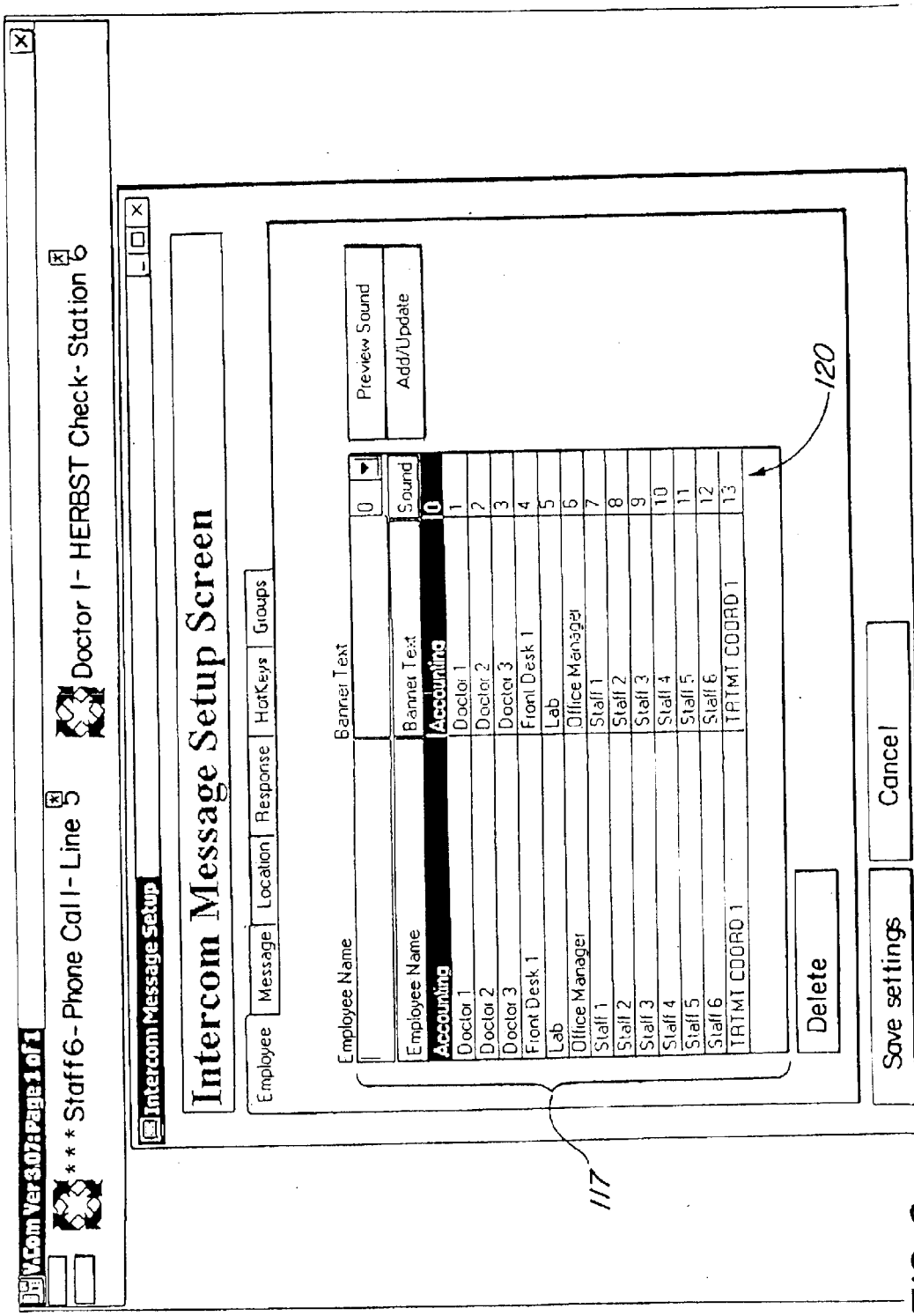
FIG. 9 is a view of the message setup screen in a first configuration.
Figure 10:
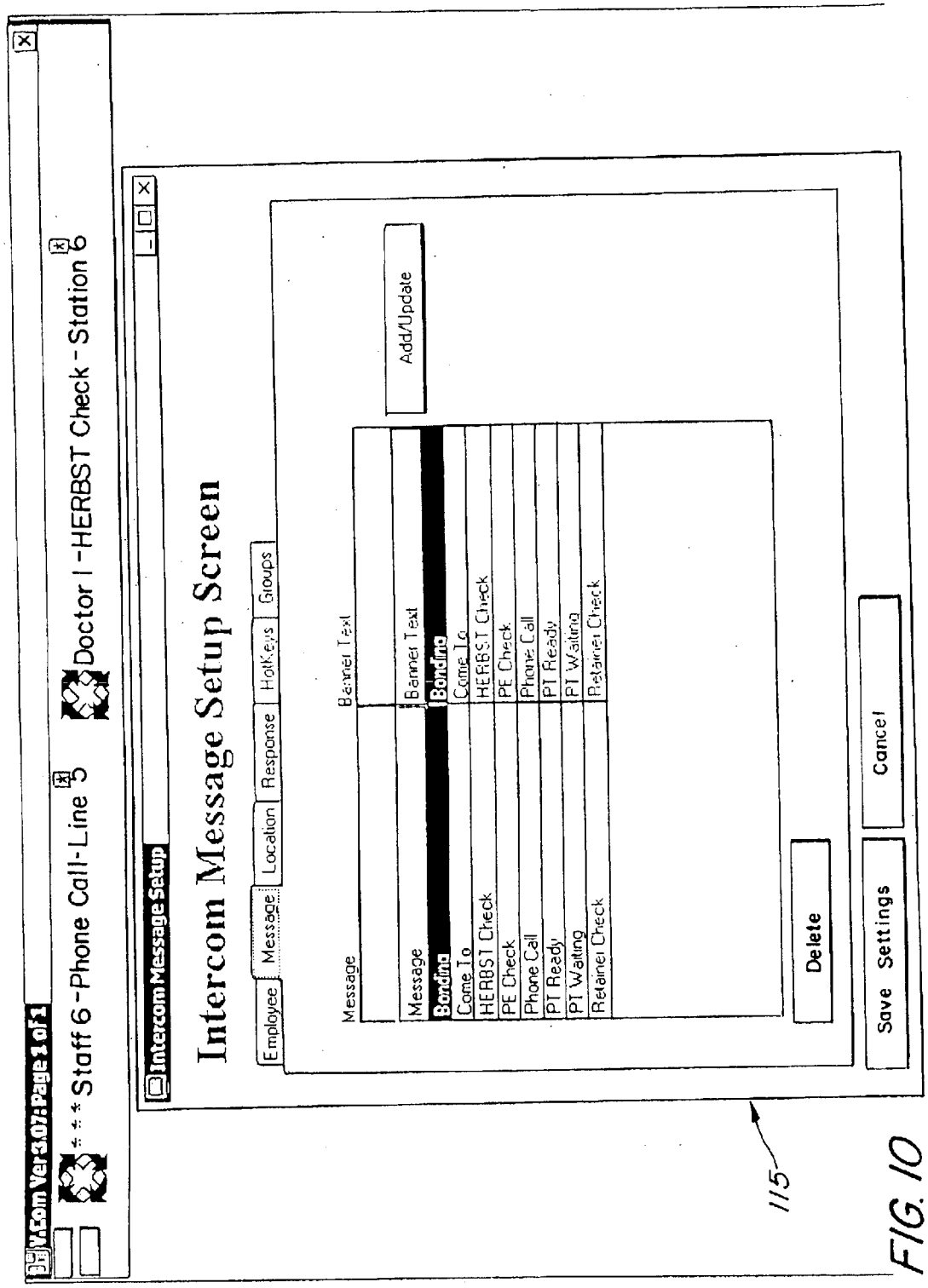
FIG. 10 is a view of the message setup screen in a second configuration.
Figure 11:
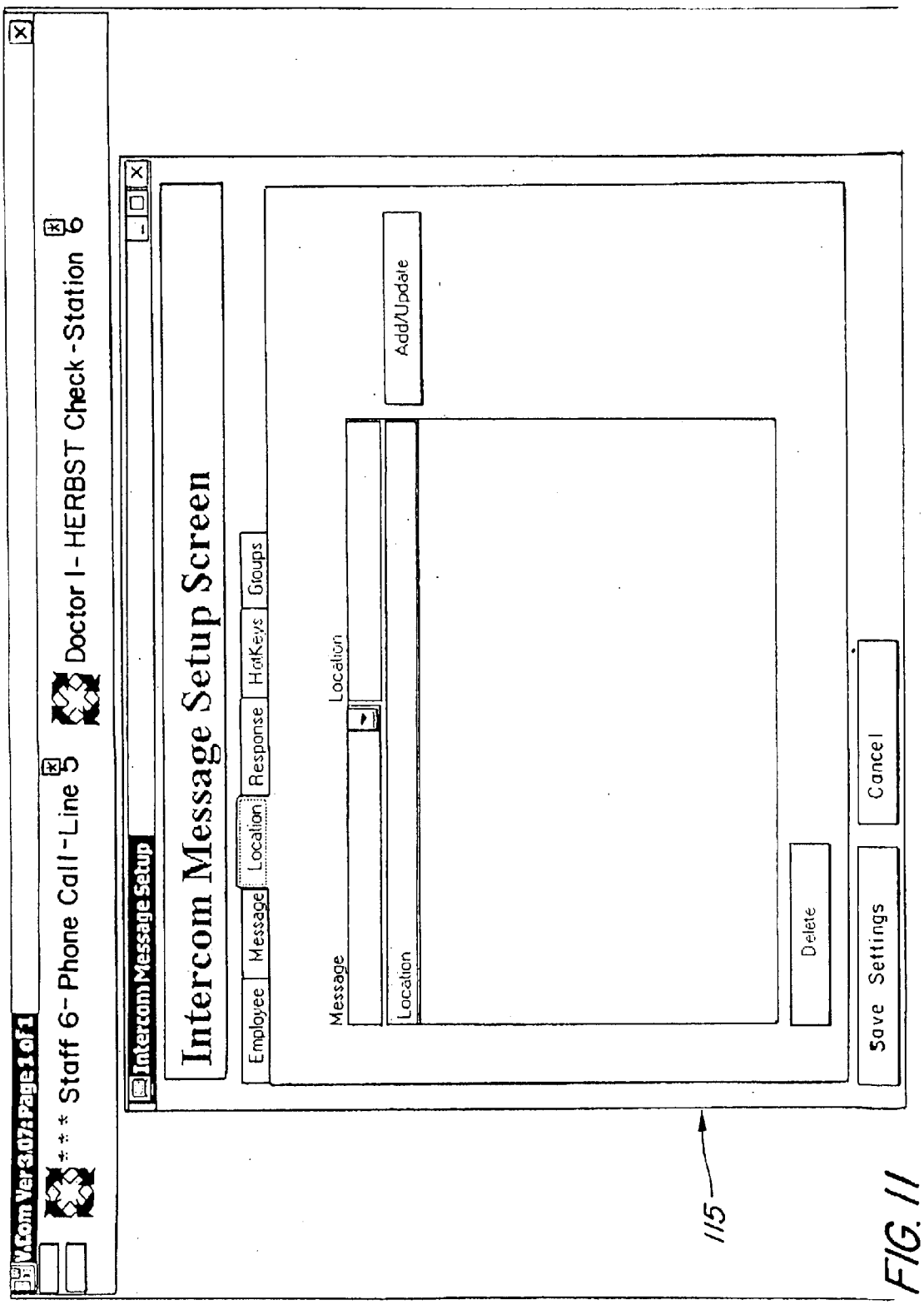
FIG. 11 is a view of the message setup screen in a third configuration.
Figure 12:
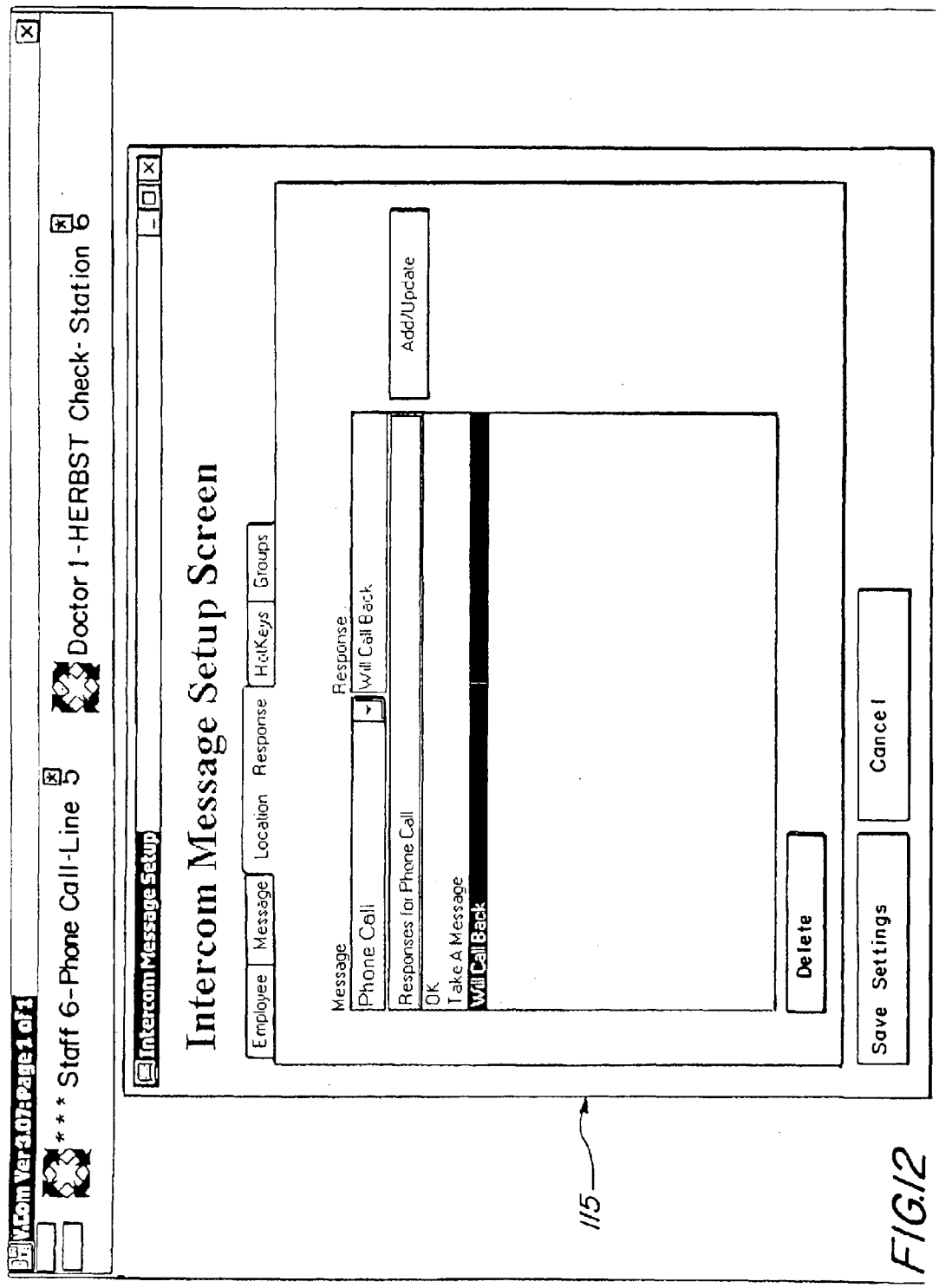
FIG. 12 is a view of the message setup screen in a fourth configuration.
Figure 13:
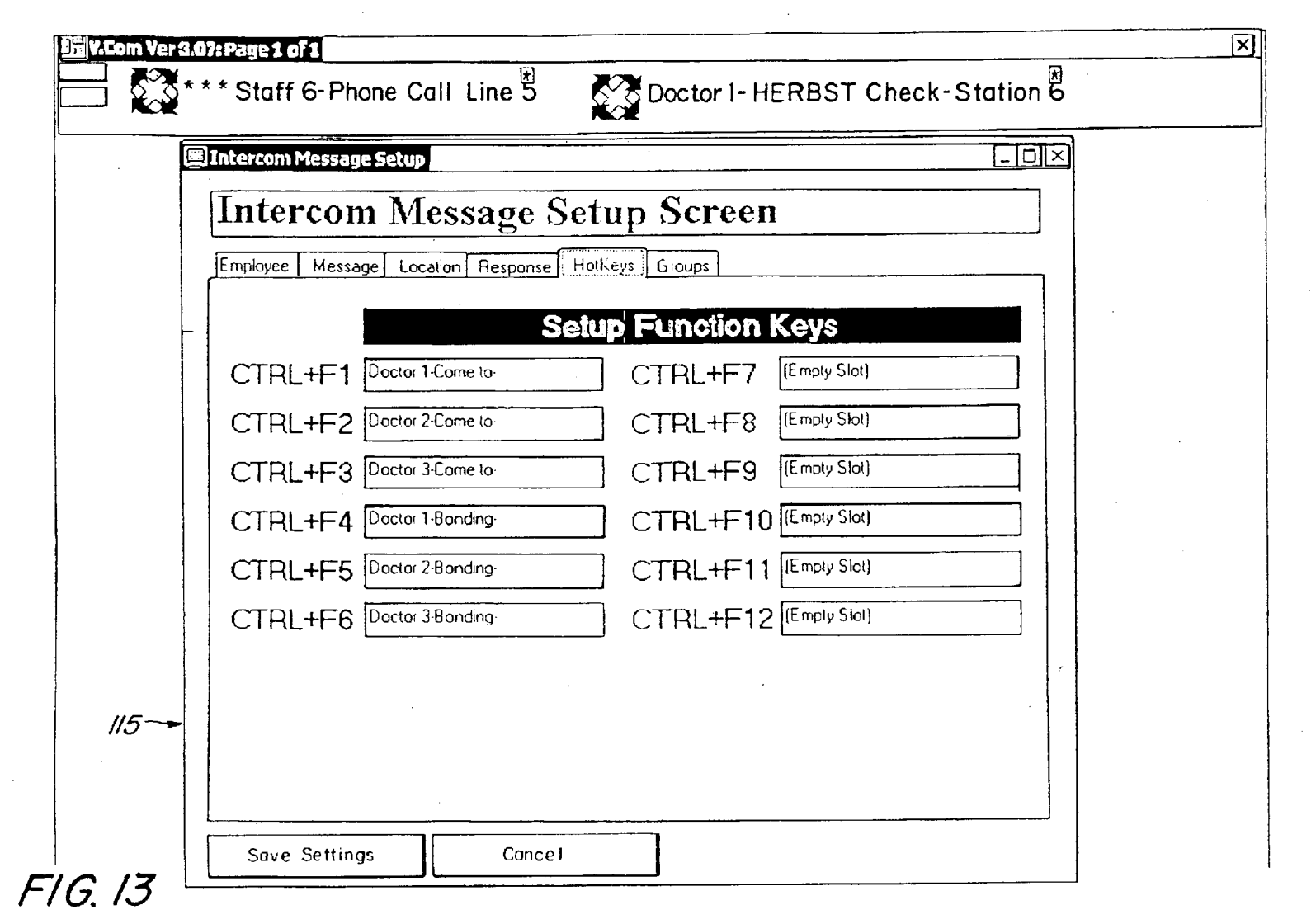
Figure 14:
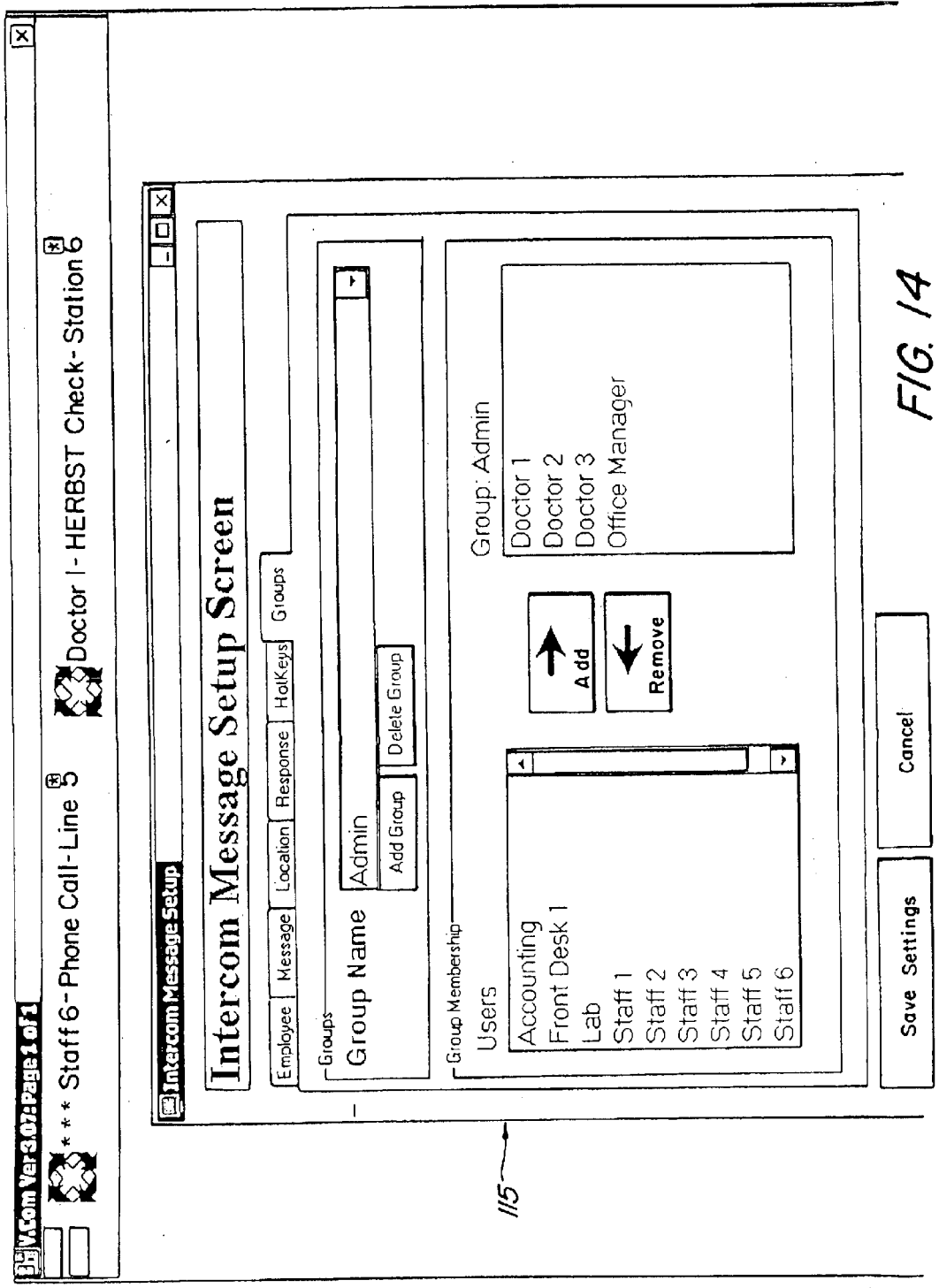
FIG. 14 is a view of the message setup screen in a sixth configuration.

As shown in FIG. 9, clicking on the setup soft button 110 brings up setup screen 115. FIG. 9 is a first configuration of the setup screen 115 in which addressees' information may be added, deleted or modified. As such, an editable list of addressees 117 corresponds to the list of addressees 40 displayed on intercom panel 35 and includes the addressees by name. Column 120 has numbers representing unique sounds or tones assigned to the addressees. FIGS. 10–14 show second through sixth configurations of the setup screen respectively that have editable lists or pre-programmable functions similar to those of the first configuration of FIG. 9. The configuration of FIG. 10 provides for preprogramming or editing preset messages 45, which will be displayed on the message panel screen 62 of FIG. 4A. FIG. 11 provides for pre-programming or editing the list of locations 50 that are also displayed on the screen 62 of FIG. 4A. FIG. 12 permits customization of lists of set responses for each preset message. These responses correspond to those in the list of responses 117 of the response options box 114 described above. FIG. 13 provides for pre-programming of function keys 60. FIG. 13 provides for setting up groups.

Having described the various elements shown in the Figures, it is to be explicitly understood, that many variations of the details of the above described system may be modified without departing from the spirit and scope of the invention. It is to be further explicitly understood that the displays with all of their parts including icons, soft buttons, fields for inserting or editing text are implemented under the network-based intercom system program control with limited input by a user as has been described above. As such, the present invention advantageously eliminates the need for hard-wired, wireless, or otherwise conventional intercom systems.

The present invention is a new and useful network-based intercom system made up of a combination of apparatuses with network-based intercom software. As such, the invention is also a new and useful method for an interoffice communication enabled by the network-based intercom system software 25 comprising a computer program. The invention is also a method to simulate a hardware based, dedicated intercom system with instant messaging.

The invention is thus a computer program system and method enabling communication between individuals or groups and allowing non-voice transmission of detailed information and responses over a local area network (LAN). It is also contemplated that the invention encompasses the above described concepts in combination with voice transmissions of detailed messages, which may be translated into text or which may be utilized to select a preset message by voice or command recognition technology. It is also contemplated that the present invention may be implemented over the Internet. In this case, it is contemplated that the system can be made to have the dispatcher on a web site, allowing the intercom to function between multiple distant locations.

Figure 15:
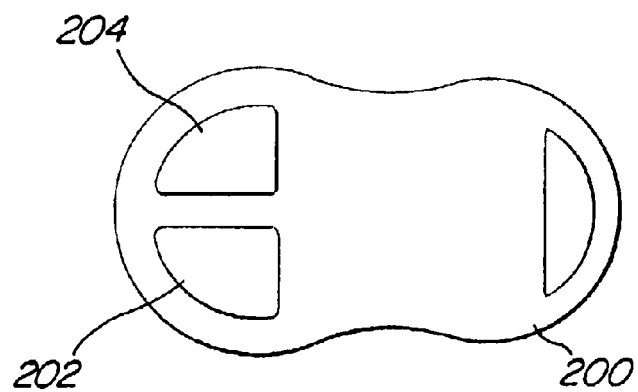
FIG. 15 is a top plan view of a portable remote control device.
Figure 16:
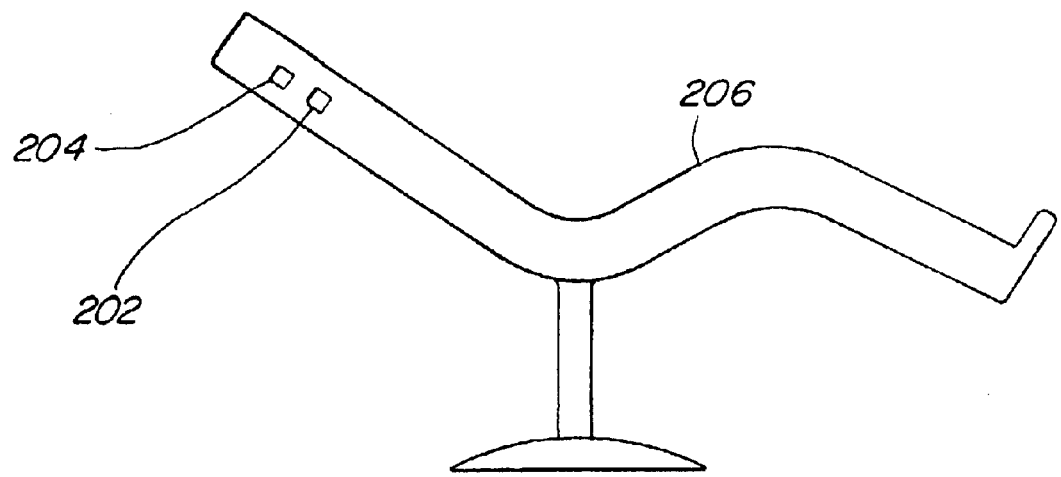
FIG. 16 is a side view of a chair having a remote control thereon.

As described above, the basic components of the network-based intercom software system 15 include a software dispatcher 27 and software intercom module 29 for respective stations 24. Alternatively, the system may be resident on a remote server accessed by, for example, "Terminal Server" or "Citrix". The software intercom module 29 is configured for operating on PC computers 21 linked by a LAN or over the Internet. The PC computers 21 are not dedicated to the network-based intercom of the present invention. Furthermore, the software 25 program resides independently from and does not interfere with any other applications running on the individual PCs. The dispatcher module 27 can reside in any of the computers 21 on the LAN. An intercom module 29 is loaded into each member computer 16 in the LAN. The voice activated system could be activated by an assistant at a patient's chair, for example. The message can be initiated from anywhere that a microphone at the station 24 can be actuated. Alternatively, a remote control device 200 is employed in combination with the system. As shown in FIG. 15, the remote control device 200 has a pair of buttons 202, 204. One of the buttons 202 can be used to create a complete message so that a user need not go to a station 24. For example, an assistant can press button 202 to call the doctor generally or to call the doctor to a particular chair 206 as shown in FIG. 16. As such, the remote control device 200 of the instant invention can either be carried by the user or installed at a site by being added to or integrally included with a chair structure or a cabinet.

Any of a variety of protocols for integrating radio frequency signals into the system 15 may be incorporated. For example, RF, IF, Blue Tooth, Wi-Fi, or other PDA type protocols may be used to implement the remote device in the system 15. Examples of these protocols are pocket 800.11A or 800.11B. The system can be set up with a receiver or transceiver for receiving a signal from such a remote device and for generating a message similar to a hot key message in accordance with software control. The first button 202 may be pressed a second time to cancel a message. Alternatively, the second button 204 can be pressed to cancel the message so that the user need not go to the keyboard to create and delete the message.

The method includes sending messages by means of bringing up network-based intercom panel screen 35, clicking on individual addressees, selectively followed by a preset message, a room location or additional message. Upon selection of the predetermined components of the basic message, the message is automatically sent. The message usually has three components. However, the number of components can be modified to meet the needs of a particular office or organization. Alternate methods for initiating messages include, but are not limited to, using the function keys for certain pre-entered messages, using the function key followed by written text of any length entered by a keyboard, clicking on a send soft button 63 on the intercom panel 35 after one or more components have been selected, or any combination of these steps.

In the preferred embodiment, the messages appear on the screens of the member computers 21 immediately and automatically and are accompanied by an audible tone unique to the addressee. The messages appear on a banner that can be modified as to size, placement, color and method of display. The method of display includes options of line by line, page at a time, and scrolling with no delay between the last message in the cue and the first message at the beginning of the cue. A symbol or some other marker is displayed proximate to either the oldest (first) message or the newest (last) message in the cue.

In an alternative embodiment, a message may be sent after a certain time delay. This time delay will typically correspond to the difference in times at the sending and receiving stations 24. The system can be configured to calculate the delay based on the difference in time zones between the sending and receiving stations 24 based on location information in the system 15. Alternatively, the user can selectively input a specific time delay. The time delay features are particularly useful in cases in which the stations are geographically remote from each other. That is, a sender may be located on the other side of the world from the recipient. The sender may want the message to reach the recipient at a specific time of the recipient's work day, for example. In either embodiment, the messages are made up of names, number codes, text, color-coded boxes, or any combination of these, and are listed in a prioritized order. Typically the order is in the order in which the messages were entered.

Prioritization allows the messages to be responded to by the addressee in the correct sequence. The banner can be set to stay on a monitor screen 23 continuously or for selectable periods of time prior to being returned to the background. Messages can be deleted by: clicking on the message to be deleted, double clicking on the message to be deleted, clicking and getting a list of all messages displayed to allow specific messages to be deleted, or pressing a function key on the PC keyboard. The function key for deleting may be the same key that initiated the message. Preferably, deleting a message may be accomplished by either one of double clicking on a specific message, or right clicking anywhere on the banner 30 and selecting a specific message from the main list of the drop down menu 129.

Additional aspects of the present invention are user selectable. The individual member PC 21 can be set to receive display messages from only specific groups or individual members within the membership. This feature helps to relieve clutter on the message banner, while allowing another individual, such as a user at a station having the dispatcher, to monitor all message traffic. It also allows specific groups within the membership to communicate within the group without the message appearing on the entire network.

Another feature allows messages to be repinged, by resending the audible tone assigned to the addressee without adding the message to the cue a second time. Other program systems allow the user to have the intercom banner appear on top of any running program screens or to only sound but not cover any running screens. In the latter case of only sounding, the banner can then be brought up by means of a function key or by clicking on an icon of the banner in the tool bar. Once the message(s) have been viewed, the banner may be returned to the background or tool bar. In this way, the system may be set by user selection to not take the focus away from any other running program so as to not interfere with data entry in progress for those other programs.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A network-based intercom system for use in a network with a plurality of stations interconnected through the network, wherein each station comprises:
   intercom means for simulating an intercom panel which is selectively displayed to communicate messages among the stations interconnected through the network;
   banner means for selectively displaying all of the messages received at each station;
   notification means for selectively generating a visual display and an audible signal which is unique to an intended recipient of the message, which audible signal is generated by at least one of the plurality of stations interconnected through the network, wherein the notification means is for selectively notifying the addressee when a message for the addressee is displayed by the at least one station after the message has been generated on another one of the plurality of stations interconnected through the network; and
   response means for directly responding to the message by an addressee interface with the visual display.

2. The intercom system of claim 1, said intercom means further comprising: a means for displaying options for user selection, said options comprising: a list of individual addressees, a list of preset messages, and a list of station locations or preset responses.

3. The intercom system of claim 2, said intercom means further comprising: means for limiting to which stations messages will be sent; wherein all messages generated on one station will normally appear on all of the banner means of all the stations unless the addressees have been limited through the means for limiting.

4. The intercom system of claim 1, wherein said banner means further comprises means for displaying banner options for user selection, comprising: means for filtering messages from other stations; wherein all messages generated on all stations will normally appear on all of the banner means of all the stations unless the senders have been limited through the means for filtering.

5. The intercom system of claim 4, wherein the means for displaying banner options comprises a means for automatically deleting a message if the addressee has not responded in a predetermined period of time.

6. The intercom system of claim 4, wherein the means for displaying banner options comprises a means for automatically generating an alert signal for a sender if the addressee has not responded in a predetermined period of time.

7. The intercom system of claim 6, wherein the alert signal is generated on the station of the sender.

8. The intercom system of claim 6, wherein the alert signal is generated on the station of the addressee.

9. The intercom system of claim 4, wherein the means for displaying banner options comprises a means for automatically deleting a message after a predetermined period after a response to the message has been made.

10. The intercom system of claim 4, wherein: the banner means displays respective message banners on screens of respective stations; the banner means further comprises means for positioning the message banner always and in a non-overlapping relation to any other windows and application displays on the screen.

11. The intercom system of claim 1, wherein: the banner means provides a message banner on each of the stations; the notification means provides the visual display in the message banner; and the response means provides respective user interface means associated with respective messages of the message banner for enabling a direct response by an addressee to a message.

12. The intercom system of claim 11, wherein the response means includes a means for generating a response by an addressee.

13. The intercom system of claim 12, wherein the response means further includes a means for displaying responses to respective messages in positions that are visually associated with the respective messages.

14. The system of claim 1, further comprising a means for generating messages including at least one hot key.

15. The system of claim 14, wherein the hot key initiates a preprogrammed partial message and brings up a dialog box prompting the sender for a customized portion of the message.

16. The system of claim 1, wherein the notification means comprise a variety of sounds corresponding to a variety of different levels of priority for messages to be sent.

17. The system of claim 1 wherein the notification means comprise color coded visual displays for easy identification by the addressee.

18. The system of claim 1, wherein the audible signal of the notification means is unique to a particular addressee.

19. A method for providing efficient, non-interruptive, distance communication by way of a network-based intercom system, said system integrated on a plurality of non-dedicated computers providing respective stations of a network, said system comprising software, said software comprising a dispatcher module in any one of said computers, said software further comprising an intercom module in each of said computers, the method comprising the steps of:
   placing a network-based intercom panel display and a message banner on a screen of each of said stations facilitated by said software control;
   maintaining a dispatcher list of all current stations in said network in said one of said computers;
   coordinating all current messages by computer readable instructions in said software in said dispatcher by: designating at least one station number to which each of said messages is sent, assigning at least one audible tone per message, and routing all of said messages automatically when a final one of a predetermined number of options has been selected;
   automatically sounding said at least one audible tone at a respective one of said computers when one of said messages is sent to said one of said computers; and providing response means; wherein said messages are automatically received on respective ones of said banners without addressee input, such that each of said messages is received in a non-interruptive manner and a notification of the arrival of a message is also received in the form of said audible tone, so that an addressee may selectively view the screen without stopping other activities.

20. The method of providing of claim 19, wherein the step of providing a response means further comprises:
programming and maintaining a list of preset response options for at least one of the addressees in the dispatcher module; and
providing means for linking a response to a respective message.

21. The method of providing of claim 19, wherein the step of assigning at least one audible tone per message further comprises assigning a unique tone to a respective addressee to whom said message is being sent.

22. The method of providing of claim 19, wherein the step of assigning at least one audible tone per message further comprises assigning a tone having a unique characteristic corresponding to a level of urgency for a respective message that is to be sent.

23. A method of using a network-based intercom system for efficient, non-interruptive, distance communication, said system being configured for implementation on a network comprising a plurality of computers providing respective stations of said network, said system comprising software including a dispatcher module for any one of said computers, said software further including an intercom module in each of said computers, the method of using comprising the sender initiated steps of:
selectively displaying a message banner on a monitor of one of said computers in which banner all messages received are displayed;
generating an audible signal which is unique to an intended recipient of a message;
initiating a message send by: bringing up a simulated intercom panel via user interface means, selecting components of a message from lists on said intercom panel;
completing a message send via user interface means; and
the method of using further comprising the addressee initiated step of: interfacing directly with a visual display associated with the message on a message banner on the monitor of the addressee in order to respond to the message.

24. The method of claim 23, further comprising at least one of said stations automatically receiving a message when a user completes a message send.

25. The method of claim 23, wherein the step of interfacing directly further comprises: clicking on an icon associated with a message on the message banner in order to initiate a response to the message.

26. The method of claim 23, wherein the step of interfacing directly further comprises: right clicking on the banner to generate a pull down menu including an option for initiating a response to a message.

27. The method of claim 23, wherein the step of interfacing directly further comprises: pressing a preprogrammed function key or hot key in order to initiate a response to the message.

28. The method of claim 23, wherein the step of interfacing directly further comprises: initiating a response by bringing up a dialog box; completing a response by: selecting at least one option from the dialog box, or typing a customized response.

29. The method of claim 28, wherein the step of completing further comprises: automatically appending the response to the message being answered.

30. The method of claim 23, wherein the network-based intercom system displays at least one response in a positionally associated location in the message banner relative to a specific message, and wherein the step of interfacing directly further comprises: selectively hiding and displaying the at least one response by clicking a response icon that is displayed together with the at least one response.

31. The method of claim 23, wherein the step of initiating a message send comprises alternatively pressing a hot key or combination of keys.

32. The method of claim 23, wherein the step of selectively displaying a message banner further comprises: selecting banner settings for automatically positioning the banner in one of: an always in a nonoverlapping relation to other windows and applications.

33. The method of claim 23, wherein the step of interfacing directly further comprises: an addressee responding to an alert signal generated at a predetermined time interval after the message was sent.

34. The method of claim 23, further comprising a sender initiated step of: selecting settings in the intercom module in order to limit the stations to which messages are sent.

35. The method of claim 23, further comprising an addressee initiated step of: selecting settings in the intercom module in order to limit the senders from whom messages can be received.

36. The method of claim 23, further comprising a sender initiated step of: selecting automatic activation of an alert signal on the station of the sender after a predetermined time interval has lapsed.

37. The method of claim 23, further comprising a sender initiated step of: selecting automatic deletion of a message after a predetermined time interval has lapsed without a response to the message.

38. A network based computer intercom user interface implemented on a plurality of stations of a network, each station having a corresponding display screen, comprising:
a software-based simulated intercom panel and means for selectively displaying said simulated intercom panel on the screen of each of said plurality of stations, the means for selectively displaying the panel displaying all of the messages received at each station;
a software-based banner display and means for selectively displaying messages received on said banner display at each of said plurality of stations;
a software controlled, audible signal and means for generating said audible signal wherein said audible signal is generated by at least one of the plurality of stations for selectively notifying the user when a message for the user is received by the at least one station, the audible signal being unique to an intended recipient; and
wherein the banner display further comprises a means for responding directly to a specific one of said messages.

39. The user interface of claim 38, wherein said means for displaying said simulated intercom panel further comprises: a means for displaying options for user selection, said options comprising: a list of individual addressees, a list of preset messages, and a list of station locations or preset responses.

40. The user interface of claim 38, wherein said means for responding directly to a specific one of said messages comprises at least one of: an icon associated with a respective message; a pull down menu linked to the message banner; or a function key programmed for responding to a specific message.

41. The user interface of claim 40, further comprising a response dialog box, wherein initiating a response to one of said messages generates the response dialog box by software control.

42. The user interface of claim 41, wherein the response dialog box includes a plurality of selectable predetermined responses appropriate for a corresponding message.

43. The user interface of claim 42, further comprising at least one response associated with one of the messages, wherein the response is positionally associated with the at least one of the messages.

44. The user interface of claim 43, further comprising: a response icon positionally associated with the at least one message and the associated response; wherein the response icon is a toggling icon for alternatively hiding or displaying the response associated with said one of the messages; and wherein the response icon has a different appearance when the response is hidden as compared to when the response is displayed.

45. The user interface of claim 38, said means for selectively displaying messages further comprising a means for displaying banner options made available to the user by software control, said banner options comprising: banner size; banner positioning on a monitor screen; banner color; and message display format in said banner, selectable from among: line-by-line, page-at-a-time, or continuous scrolling of a list of messages to be displayed.

46. The user interface of claim 45, said banner means comprising a means for selective message deletion, by at least one of: clicking on the message, displaying a list of all the messages for selective message deletion from among said list, and pressing a specific function key for deleting a specific message.

47. The user interface of claim 46, further comprising: an alert signal indicating that the message has not been answered after a selectable first predetermined time period; wherein the means for selective message deletion comprises automatic deletion of messages that have not been responded to within a selectable second predetermined time period.

48. The user interface of claim 47, wherein the alert signal comprises each of a visual signal on the banner display and an audio signal generated by at least one of the stations.

49. The user interface of claim 48, wherein the alert signal is provided at least on the station corresponding to the sender for notifying the sender that his or her message has not been answered.

50. The user interface of claim 48, wherein the alert signal is provided on at least the station corresponding to the addressee for notifying the addressee that he or she has received a message that has not been answered.

51. The user interface of claim 38, wherein: said means for selectively displaying messages further comprises a means for displaying banner options made available to the user by software control; said banner options comprising means for user selection of individuals or groups from among the users; said user selection is for limiting from whom the messages at said station may be received.

52. The user interface of claim 38, said means for selectively displaying said simulated intercom panel further comprising means for user selection of individuals or groups from among the users, wherein said user selection is for limiting to whom messages may be sent.

53. The user interface of claim 39, wherein said means for selectively displaying said simulated intercom panel further comprises a means for selectively storing non-urgent messages by software control directly into patient charts for later printing or retrieving.

54. The user interface of claim 45, wherein the banner positioning on the screen is user selectable to automatically always be positioned in a non-overlapping relation relative to all other windows and applications on the screen.

55. The user interface of claim 45, wherein the banner positioning on the screen is user selectable to automatically always be positioned in front relative to all other windows and applications on the screen.

56. The user interface of claim 39, comprising: a means for initiating a message send, said means for initiating said message send comprising at least one of: bringing up said simulated intercom panel on a computer screen of at least one of said stations of said network, clicking on at least one of an individual or a group addressee in a list of addressees, or pressing a function key or hot key; and a means for automatic message receipt that requires no intervention by an addressee, wherein a sent message is automatically received and automatically appears on a banner of said addressee.

57. The user interface of claim 45, said means for displaying messages further comprising a means for selectively, automatically including an indicator of at least one of a sender and a location of the sender associated with each message received on said banner.

58. The user interface of claim 38, said user interface adapted to be implemented on respective computers of said plurality of stations of said network and adapted to form a network based intercom system, said network based intercom system comprising: a software controlled dispatcher adapted to be implemented in at least one of the plurality of said computers, said software controlled dispatcher comprising means for controlling: message routing, assignment of unique tones to respective users, designation of station numbers, assignment of message codes, assignment of response codes, and prioritization of messages for display.

59. The user interface of claim 38, wherein said audible signal is unique to a user of the intercom system.

60. The user interface of claim 38, said user interface adapted to be implemented on said computers of respective said stations of said network and adapted to form a network based intercom system, said network based intercom system comprising: a software controlled dispatcher adapted to be implemented in each of a plurality of said computers, said software controlled dispatcher comprising means for controlling: message routing, assignment of unique tones to respective users, designation of station numbers, assignment of message codes, and prioritization of messages for display, and means for activating one of said plurality of said dispatchers when another one of said dispatchers is closed.

61. The user interface of claim 60, comprising means for automatically activating said one of said dispatchers when said another one of said dispatchers is closed, wherein said another one of said dispatchers is closed as a result of the computer in which said another one of said dispatchers resides being shut down.

62. The user interface of claim 38, comprising a means for initiating a message send, said means for initiating said message send including at least one hot key or combination of keys.

63. The user interface of claim 62, wherein the hot key or combination of keys initiates a preprogrammed partial message and brings up a dialog box prompting the sender for a customized portion of the message.

64. The user interface of claim 38 further comprising a remote control device for sending commands to the intercom panel for hot keyed messages or message handling commands.

* * * * *